United States Patent
Chen

(10) Patent No.: US 10,637,806 B2
(45) Date of Patent: Apr. 28, 2020

(54) USER INTERFACE FOR A CHATTING APPLICATION DISPLAYING A VISUAL REPRESENTATION OF A VOICE MESSAGE WITH FEATURE INFORMATION INDICATING A MOOD

(71) Applicant: Huawei Technologies Co., Ltd., Shenzhen (CN)

(72) Inventor: Xi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 438 days.

(21) Appl. No.: 15/537,338

(22) PCT Filed: Mar. 14, 2014

(86) PCT No.: PCT/CN2014/073475
§ 371 (c)(1),
(2) Date: Jun. 16, 2017

(87) PCT Pub. No.: WO2015/000307
PCT Pub. Date: Jan. 8, 2015

(65) Prior Publication Data
US 2017/0353408 A1    Dec. 7, 2017

(30) Foreign Application Priority Data
Jul. 2, 2013 (CN) .......................... 2013 1 0274892

(51) Int. Cl.
*H04L 12/58* (2006.01)
*H04L 29/08* (2006.01)
(Continued)

(52) U.S. Cl.
CPC .............. *H04L 51/046* (2013.01); *G06F 3/14* (2013.01); *G06F 3/147* (2013.01); *G06F 40/205* (2020.01);
(Continued)

(58) Field of Classification Search
CPC ........ G06F 3/0482; G10L 25/63; H04L 51/10
See application file for complete search history.

(56) References Cited

U.S. PATENT DOCUMENTS 8,271,003 B1 * 9/2012 Othmer ............... H04M 1/7255
455/466
2004/0078357 A1 * 4/2004 LaChapelle .......... G11B 27/034
(Continued)

FOREIGN PATENT DOCUMENTS

CN        1704958 A    12/2005
CN        1739309 A     2/2006
(Continued)

OTHER PUBLICATIONS

Ericsson Mobility World USA, "MMS Developer's Guide" (Oct. 2001), pp. 1-20.*

*Primary Examiner* — Asher D Kells
(74) *Attorney, Agent, or Firm* — Leydig, Voit & Mayer, Ltd.

(57) ABSTRACT

Embodiments of the present invention disclose a method and an apparatus for displaying media information, so as to display the media information. The method for displaying media information includes: receiving a media information request sent by an originating client, where the media information request carries media information and destination client information; parsing the received media information to obtain text information corresponding to the media information; synthesizing information related to the media information with information related to the text information to obtain composite information; and sending the composite information to a destination client according to the destination client information, so that the destination client obtains the media information and the text information according to (Continued)

the composite information and displays the media information and the text information.

15 Claims, 16 Drawing Sheets

(51) Int. Cl.
| | |
|---|---|
| G06F 3/147 | (2006.01) |
| G06F 3/14 | (2006.01) |
| G06F 40/205 | (2020.01) |
| G06F 40/279 | (2020.01) |
| H04L 29/06 | (2006.01) |
| G06F 3/0482 | (2013.01) |
| G10L 13/08 | (2013.01) |
| G10L 15/22 | (2006.01) |
| G10L 15/30 | (2013.01) |
| G10L 25/63 | (2013.01) |

(52) U.S. Cl.
CPC ............ *G06F 40/279* (2020.01); *H04L 51/10* (2013.01); *H04L 65/403* (2013.01); *H04L 67/2804* (2013.01); *H04L 67/2814* (2013.01); *G06F 3/0482* (2013.01); *G10L 13/08* (2013.01); *G10L 15/22* (2013.01); *G10L 15/30* (2013.01); *G10L 25/63* (2013.01)

(56) References Cited

U.S. PATENT DOCUMENTS

| | | | |
|---|---|---|---|
| 2004/0176114 | A1 | 9/2004 | Northcutt |
| 2005/0198096 | A1 | 9/2005 | Shaffer et al. |
| 2005/0267761 | A1 | 12/2005 | Ueno |
| 2008/0273675 | A1* | 11/2008 | Siminoff ............... H04M 3/537 379/88.14 |
| 2009/0254829 | A1* | 10/2009 | Rohde .................. G06F 3/0481 715/727 |
| 2011/0222673 | A1* | 9/2011 | Piemonte ............. H04M 1/656 379/88.12 |
| 2011/0271213 | A1 | 11/2011 | Newman et al. |
| 2012/0330658 | A1* | 12/2012 | Bonforte ................ H04W 4/21 704/235 |
| 2013/0067304 | A1 | 3/2013 | Peng et al. |
| 2013/0121481 | A1* | 5/2013 | Mikan .................... H04L 51/10 379/88.14 |
| 2013/0337779 | A1 | 12/2013 | Tang |
| 2014/0236596 | A1* | 8/2014 | Martinez ............ G06F 17/2785 704/235 |

FOREIGN PATENT DOCUMENTS

| | | |
|---|---|---|
| CN | 1906605 A | 1/2007 |
| CN | 101075983 A | 11/2007 |
| CN | 102263705 A | 11/2011 |
| CN | 102750365 A | 10/2012 |
| CN | 102870373 A | 1/2013 |
| CN | 103327181 A | 9/2013 |
| CN | 103369477 A | 10/2013 |
| WO | 2004080095 A1 | 9/2004 |

\* cited by examiner

USER INTERFACE FOR A CHATTING APPLICATION DISPLAYING A VISUAL REPRESENTATION OF A VOICE MESSAGE WITH FEATURE INFORMATION INDICATING A MOOD

This application is a national stage of International Application No. PCT/CN2014/073475, filed on Mar. 14, 2014, which claims priority to Chinese Patent Application No. 201310274892.X, filed on Jul. 2, 2013, all of which are incorporated herein by reference in their entireties.

TECHNICAL FIELD

The present invention relates to the mobile Internet field, and in particular, to a method, an apparatus, and a client for displaying media information, and a method and an apparatus for displaying graphical controls.

BACKGROUND

As mobile Internet technologies are popularized and applied, media information communications software such as WeChat and MiTalk is popular with numerous user groups. Currently, in a media information communication process performed by using such social communications software, because only media links of media information can be displayed, it is very difficult for a user to browse instant communication records. FIG. 1 shows a schematic diagram of a user interface for displaying media information in the prior art after multiple pieces of media information are exchanged in a group chat. Media information content of the time cannot be determined ultimately when browsed after a period of time. To browse the media information content of the time, the user has to repeatedly click media links of all media information. When the media information content is browsed in this manner, a lot of storage space and processes on a terminal need to be occupied, and a large quantity of central processing unit (CPU) resources are occupied. Consequently, parallel speeds of other processes are affected, and efficiency of obtaining the media information content is low.

SUMMARY

In view of this, an objective of the present invention is to provide a method, an apparatus, and a client for displaying media information, and a method and an apparatus for displaying graphical controls, so as to reduce storage space and processes occupied on a terminal in a media information communication process, reduce consumption of CPU resources, and improve efficiency of obtaining media information content.

According to a first aspect, a method for displaying media information is provided and includes: receiving a media information request sent by an originating client, where the media information request carries media information and destination client information; parsing the received media information to obtain text information corresponding to the media information; synthesizing information related to the media information with information related to the text information to obtain composite information; and sending the composite information to a destination client according to the destination client information, so that the destination client obtains the media information and the text information according to the composite information and displays the media information and the text information.

In a first possible implementation of the first aspect, the information related to the media information includes the media information or a media information identifier, and the information related to the text information includes the text information or a text information identifier.

With reference to the first aspect or the first possible implementation of the first aspect, in a second possible implementation of the first aspect, the text information includes at least one of the following: text content corresponding to the media information or a keyword corresponding to text content.

With reference to the first aspect or the first possible implementation of the first aspect or the second possible implementation of the first aspect, in a third possible implementation of the first aspect, the information related to the media information is the media information, and the information related to the text information is the text information; the synthesizing information related to the media information with information related to the text information to obtain composite information specifically includes: synthesizing the media information with the text information into composite format information; the sending the composite information to a destination client is specifically: sending the composite format information to the destination client; and that the destination client obtains the media information and the text information according to the composite information is specifically that the destination client obtains the media information and the text information by parsing the composite format information.

With reference to the first aspect or the first possible implementation of the first aspect or the second possible implementation of the first aspect, in a fourth possible implementation of the first aspect, the method further includes: creating a data association table according to the text information, and establishing an association relationship between the text information identifier and the text information.

With reference to the fourth possible implementation of the first aspect, in a fifth possible implementation of the first aspect, the information related to the media information is the media information, and the information related to the text information is the text information identifier; the synthesizing information related to the media information with information related to the text information to obtain composite information is specifically: querying the data association table according to the text information to obtain the text information identifier corresponding to the text information, and synthesizing the media information with the text information identifier to obtain composite information; and that the destination client obtains the media information and the text information according to the composite information specifically includes: the destination client obtains the media information according to the composite information, and obtains the corresponding text information by parsing the text information identifier in the composite information.

With reference to the second possible implementation of the first aspect, in a sixth possible implementation of the first aspect, the method further includes: creating a data association table according to the media information, the text content, and the keyword, and separately establishing association relationships between the media information identifier and the media information, a text content identifier and the text content, and a keyword identifier and the keyword.

With reference to the sixth possible implementation of the first aspect, in a seventh possible implementation of the first aspect, the information related to the media information is the media information identifier, and the information related to the text information is the text information identifier; the synthesizing information related to the media information with information related to the text information to obtain composite information is specifically: querying the data association table according to the media information and the text information to obtain the media information identifier corresponding to the media information, the text content identifier corresponding to the text content, and the keyword identifier corresponding to the keyword, and synthesizing the media information identifier with the text content identifier and the keyword identifier to obtain composite information; and that the destination client obtains the media information and the text information according to the composite information specifically includes: the destination client obtains the corresponding media information by parsing the media information identifier in the composite information; the destination client obtains the corresponding text content by parsing the text content identifier in the composite information; and the destination client obtains the corresponding keyword by parsing the keyword identifier in the composite information.

With reference to the third possible implementation of the first aspect, in an eighth possible implementation of the first aspect, the composite format information includes an audio file header, an audio bit stream, and an audio extension field; a reserved field in the audio file header identifies an offset of information of the audio extension field in an entire audio file of the media information; and the information of the audio extension field includes the text information corresponding to the media information.

With reference to the first aspect and any one of the foregoing possible implementations of the first aspect, in a ninth possible implementation of the first aspect, the text information is sent to the originating client, so that the originating client displays the media information and the text information.

According to a second aspect, a method for displaying media information includes: receiving composite information sent by a server, where the composite information is obtained by the server after the server parses received media information to obtain text information and synthesizes information related to the media information with information related to the text information; parsing the composite information to obtain the media information and the text information; and displaying the media information and the text information.

In a first possible implementation of the second aspect, the text information includes at least one of the following: text content corresponding to the media information or a keyword corresponding to text content.

With reference to the second aspect, in a second possible implementation of the second aspect, the information related to the media information is the media information, and the information related to the text information is a text information identifier; and the parsing the composite information to obtain the media information and the text information is specifically: parsing the text information identifier in the composite information to obtain the corresponding text information.

With reference to the first possible implementation of the second aspect, in a third possible implementation of the second aspect, the information related to the media information is a media information identifier, and the information related to the text information is a text information identifier; and the parsing the composite information to obtain the media information and the text information is specifically: parsing the media information identifier in the composite information to obtain the corresponding media information; parsing a text content identifier in the composite information to obtain the corresponding text content; and parsing a keyword identifier in the composite information to obtain the corresponding keyword.

In a fourth possible implementation of the second aspect, the composite information is composite format information, and the composite format information includes an audio file header, an audio bit stream, and an audio extension field; a reserved field in the audio file header identifies an offset of information of the audio extension field in an entire audio file of the media information; and the information of the audio extension field includes the text information corresponding to the media information.

In a fifth possible implementation of the second aspect, the displaying the media information and the text information is specifically: displaying, according to a switching instruction, the media information, or the media information and the text information.

According to a third aspect, a method for displaying graphical controls is provided, where the method is applied to a computer system, and the computer system includes a display screen and an application program, where the method includes:

invoking the application program, and displaying a user interface of the application program on the display screen; and invoking multiple control functions in the application program, and displaying graphical controls corresponding to the multiple control functions in the user interface of the application program, where the graphical controls include at least a contact graphical control, a media information graphical control, and a text graphical control, where the contact graphical control is configured to display contact information, the media information graphical control is configured to play corresponding media information, and the text graphical control is configured to display text information corresponding to the media information.

In a first possible implementation of the third aspect, the text graphical control further includes a text content graphical control and/or a keyword graphical control, where the text content graphical control is configured to display text content corresponding to the media information, and the keyword graphical control is configured to display a keyword corresponding to the text content corresponding to the media information.

With reference to the third aspect and the first possible implementation of the third aspect, in a second possible implementation of the third aspect, the method includes: receiving a switching instruction, and switching, according to the switching instruction, between displaying the media information graphical control in the user interface of the application program and displaying the media information graphical control and the text graphical control in the user interface of the application program.

In a third possible implementation of the third aspect, the method includes: displaying a switching function graphical control in the user interface of the application program, where the switching function graphical control is configured to receive the switching instruction.

According to a fourth aspect, an apparatus for displaying media information includes an interaction unit, a recognition unit, and a synthesis unit. The interaction unit receives a media information request sent by an originating client, where the media information request carries media information and destination client information, and further sends composite information to a destination client according to the destination client information carried in the media information request; the recognition unit parses the media information carried in the received media information request to obtain text information corresponding to the media information; and the synthesis unit synthesizes information related to the media information with information related to the text information to obtain the composite information.

In a first possible implementation of the fourth aspect, the composite information is specifically composite format information, and the synthesis unit further synthesizes the media information with the text information into the composite format information.

In a second possible implementation of the fourth aspect, the apparatus further includes a processing unit and a storage unit. The processing unit creates a data association table, and establishes an association relationship between a text information identifier and the text information; the interaction unit further receives a request sent by the client for querying the text information identifier; the storage unit stores the data association table of the association relationship between the text information identifier and the text information; and the interaction unit further sends the text information to the originating client and the destination client.

In a third possible implementation of the fourth aspect, the apparatus further includes a processing unit and a storage unit. The processing unit further creates a data association table, and establishes association relationships between a media information identifier and the media information, a text content identifier and the text content, and a keyword identifier and the keyword; the interaction unit further receives a request sent by the client for querying the media information identifier, the text content identifier, and the keyword identifier; the storage unit stores the data association table of the association relationships between the media information identifier and the media information, the text content identifier and the text content, and the keyword identifier and the keyword; and the interaction unit further sends the media information, the text content, and the keyword to the originating client and the destination client.

According to a fifth aspect, a client for displaying media information includes an interaction unit, a parsing unit, and a display unit. The interaction unit receives composite information sent by a server, where the composite information is obtained by the server after the server parses received media information to obtain text information and synthesizes information related to the media information with information related to the text information; the paring unit parses the composite information to obtain the media information and the text information; and the display unit displays the media information and the text information.

In a first possible implementation of the fifth aspect, the interaction unit further sends a query request to the server, requesting the server to query the text information corresponding to a text information identifier; and the interaction unit further receives the text information sent by the server.

In a second possible implementation of the fifth aspect, the interaction unit further sends a query request to the server, requesting the server to query the media information corresponding to a media information identifier, text content corresponding to a text content identifier, and keyword information corresponding to a keyword identifier; and the interaction unit further receives the media information, the text content, and the keyword sent by the server.

According to a sixth aspect, an apparatus for displaying graphical controls is provided, where the apparatus includes a display screen, and the apparatus further includes a control unit, a control function unit, and a display unit. The control unit is configured to invoke an application program, and instruct the display unit to display a user interface of the application program on the display screen; the control function unit is configured to invoke multiple control functions in the application program, and instruct the display unit to display graphical controls corresponding to the multiple control functions in the user interface of the application program, where the graphical controls include at least a contact graphical control, a media information graphical control, and a text graphical control, where the contact graphical control is configured to display contact information, the media information graphical control is configured to play corresponding media information, and the text graphical control is configured to display text information corresponding to the media information; and the display unit is configured to display the user interface of the application program on the display screen, and display the graphical controls corresponding to the multiple control functions in the user interface of the application program, where the graphical controls include at least the contact graphical control, the media information graphical control, and the text graphical control.

In a first possible implementation of the sixth aspect, the apparatus further includes a control switching unit. The control switching unit is configured to instruct the display unit to switch between displaying the media information graphical control in the user interface of the application program and displaying the media information graphical control and the text graphical control in the user interface of the application program; and the display unit is further configured to display, according to the instruction of the control switching unit, the media information graphical control in the user interface of the application program, or the media information graphical control and the text graphical control in the user interface of the application program.

In a second possible implementation of the sixth aspect, the display unit is further configured to display a switching function graphical control corresponding to the control switching unit in the user interface of the application program, where the switching function graphical control is configured to receive a switching instruction, and instruct, according to the switching instruction, the display unit to display the media information graphical control in the user interface of the application program or display the media information graphical control and the text graphical control in the user interface of the application program.

According to a seventh aspect, a method for displaying media information includes: receiving a media information request, where the media information request carries media information; parsing the received media information to obtain text information corresponding to the media information; and displaying the media information and the text information.

In a first possible implementation of the seventh aspect, the method further includes: displaying, according to a switching instruction, the media information, or the media information and the text information.

According to an eighth aspect, an apparatus for displaying media information includes an interaction unit, a recognition unit, and a display unit. The interaction unit is configured to receive a media information request, where the media information request carries media information; the recognition unit is configured to parse the received media information to obtain text information corresponding to the media information; and the display unit is configured to display the media information and the text information.

In a first possible implementation of the eighth aspect, the interaction unit is further configured to receive a switching instruction, and instruct the display unit to display the media information or display the media information and the text information.

According to the foregoing technical solutions, features of media information and text information are displayed on a client. For example, a server synthesizes information related to the media information with information related to the text information to obtain composite information; and the client receives the composite information and displays the media information and the text information. Therefore, the text information corresponding to the media information is retrieved quickly, and efficiency of obtaining media information content is improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Currently, in a media information communication process performed by a user by using social communications software, because only media links of media information can be displayed, when all users use this method for communication, it is very difficult to browse communication records, and user experience is very poor. To browse media information content of the time, the user can only click media links of all media information and listen to each piece of media information again. When the media information content is browsed in this manner, a lot of storage space and processes on a terminal need to be occupied, and a large quantity of CPU resources are occupied. Consequently, parallel speeds of other processes are affected, and efficiency of obtaining the media information content is low. An embodiment of the present invention provides a method for displaying media information visually, so as to quickly retrieve text information corresponding to media information and improve efficiency of obtaining media information content.

Figure 1:
FIG. 1 is a schematic diagram of a user interface for displaying media information in the prior art.
Figure 2:
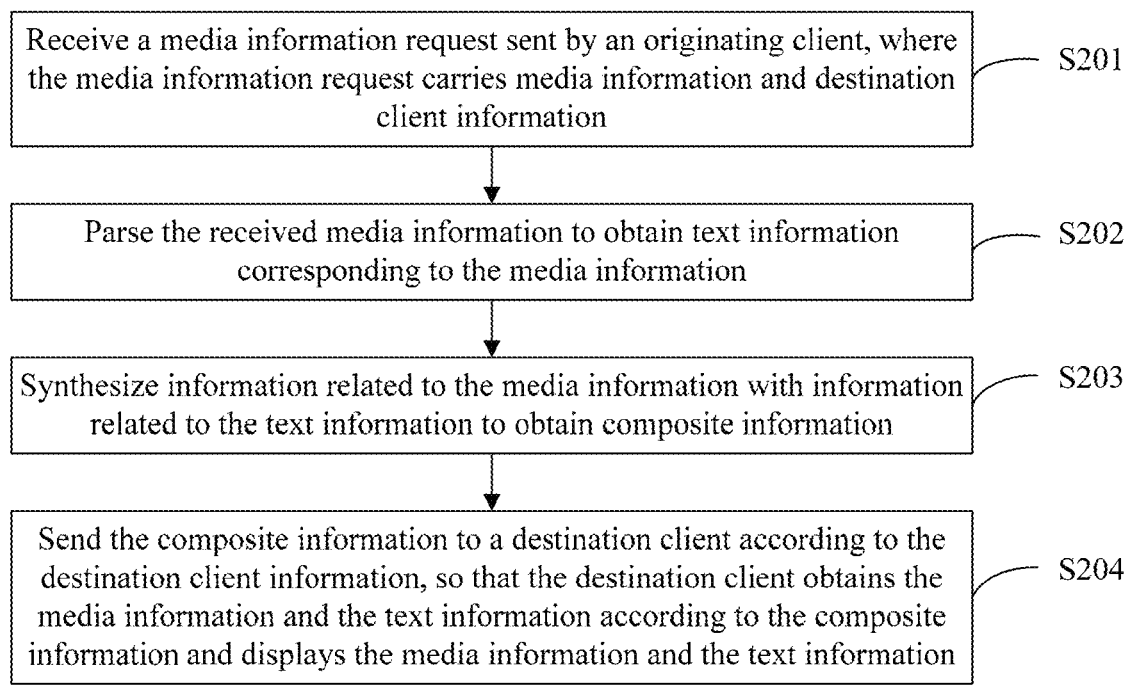
FIG. 2 is a schematic flowchart of a method for displaying media information according to an embodiment of the present invention.

FIG. 2 is a schematic flowchart of a method for displaying media information according to an embodiment of the present invention. The embodiment of the method for displaying media information includes the following steps.

S201. A server receives a media information request sent by an originating client, where the media information request carries media information and destination client information.

The media information request includes prerecorded media information and the destination client information.

The media information may be audio information, video information, or the like.

The originating client may prerecord a segment of media information to be sent to a destination client, and when the media information needs to be sent to the destination client, send the media information request to the server. The media information request carries the media information and the destination client information.

The destination client information may be specifically a number, an address, a mobile phone number, a nickname, or the like of the client.

S202. The server parses the received media information to obtain text information corresponding to the media information.

The server parses the media information carried in the received media information request to obtain the text information corresponding to the media information. That the server parses the media information is specifically that the server performs media recognition according to the media information to obtain text content corresponding to the media information.

The server may further determine, according to the recognized text content corresponding to the media information, a keyword corresponding to the text content, for example, a tag or other feature information corresponding to the media information. The other feature information corresponding to the media information may be "angry", "happy", "sad", "anxious", "surprised", or the like that is used to describe a mood of a user. An expression of a user mood may be recognized according to other feature information corresponding to speech information and a word used to describe the user mood. This feature may be displayed on the client as an optional information display option. The other feature information corresponding to the media information may be replaced or changed. This is not specifically limited in this embodiment of the present invention.

After the server completes parsing of the media information, the server may obtain the text information corresponding to the media information, for example, the text content corresponding to the media information and the keyword corresponding to the text content.

In this embodiment of the present invention, the text information may include the text content, or the keyword, or the text content and the keyword. The keyword may include the tag, or the other feature information corresponding to the media information, or the tag and the other feature information corresponding to the media information. The tag is a brief summary of the text content. The other feature information corresponding to the media information may be specifically a user mood analyzed by the server according to media, a speaking speed, an intonation, and a meaning of the media information, for example, a feature such as "angry", "happy", "sad", "anxious", or "surprised". This feature may be displayed on the client as an optional information display option. The other feature information corresponding to the media information may be replaced or changed. This is not specifically limited in this embodiment of the present invention.

For example, the text content corresponding to the media information is "It is a holiday tomorrow. I invite everyone to dinner".

The tag corresponding to the text content is "invite to dinner".

The other feature information corresponding to the media information is "happy".

S203. The server synthesizes information related to the media information with information related to the text information to obtain composite information.

The information related to the media information includes the media information or a media information identifier. The information related to the text information includes the text information or a text information identifier.

In another embodiment of the present invention, the synthesizing information related to the media information with information related to the text information to obtain composite information may be specifically: when the information related to the media information is the media information, and the information related to the text information is the text information, synthesizing the media information with the text information into composite format information.

In another embodiment of the present invention, the synthesizing information related to the media information with information related to the text information to obtain composite information may be specifically: creating a data association table according to the text information, and establishing an association relationship between the text information identifier and the text information; and when the information related to the media information is the media information, and the information related to the text information is the text information identifier, querying the data association table according to the text information to obtain the text information identifier corresponding to the text information, and synthesizing the media information with the text information identifier to obtain composite information.

In another embodiment of the present invention, the synthesizing information related to the media information with information related to the text information to obtain composite information may be specifically: creating a data association table according to the media information, the text content, and the keyword, and separately establishing association relationships between the media information identifier and the media information, a text content identifier and the text content, and a keyword identifier and the keyword; and when the information related to the media information is the media information identifier, and the information related to the text information is the text information identifier, querying the data association table according to the media information and the text information to obtain the media information identifier corresponding to the media information, the text content identifier corresponding to the text content, and the keyword identifier corresponding to the keyword, and synthesizing the media information identifier with the text content identifier and the keyword identifier to obtain composite information.

S204. Send the composite information to a destination client according to the destination client information, so that the destination client obtains the media information and the text information according to the composite information and displays the media information and the text information.

The server recognizes the destination client according to the destination client information carried in the media information request, and sends the composite information to the destination client.

In this embodiment of the present invention, the server may further send, to the originating client, the text information corresponding to the media information, so that the originating client displays the text information.

The text information may include the text content, or the keyword, or the text content and the keyword.

In this embodiment of the present invention, the client may be installed on a terminal or a mobile terminal such as a mobile phone, a personal computer (PC), or a tablet computer PAD.

In another embodiment of the present invention, when the originating client or the destination client displays information, the client may dynamically process a user interface information display option by means of menu setting or switching according to a user interface display status, or content related to the media information, or a user requirement, so as to display more related information. The user interface information display option includes but is not limited to the media information, the text content corresponding to the media information, the tag corresponding to the text content, the other feature information corresponding to the media information, a user expression corresponding to the text content, a media information sending time, a media information receiving time, a media information length, a media information sender number or address, a media information receiver number or address, the other feature information corresponding to the media information, or the like. In the user interface, not only the information display option is displayed, but also a switching function control can be displayed. The switching function control may be configured to switch between displaying the media information and displaying the media information and the text information corresponding to the media information, and display, in the user interface according to a user operation, the media information, or the media information and the text information corresponding to the media information.

In the embodiment of the method for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

In this embodiment of the present invention, the media information includes audio information, video information, or the like. In the following embodiment, audio information is used as an example for description.

Figure 3:
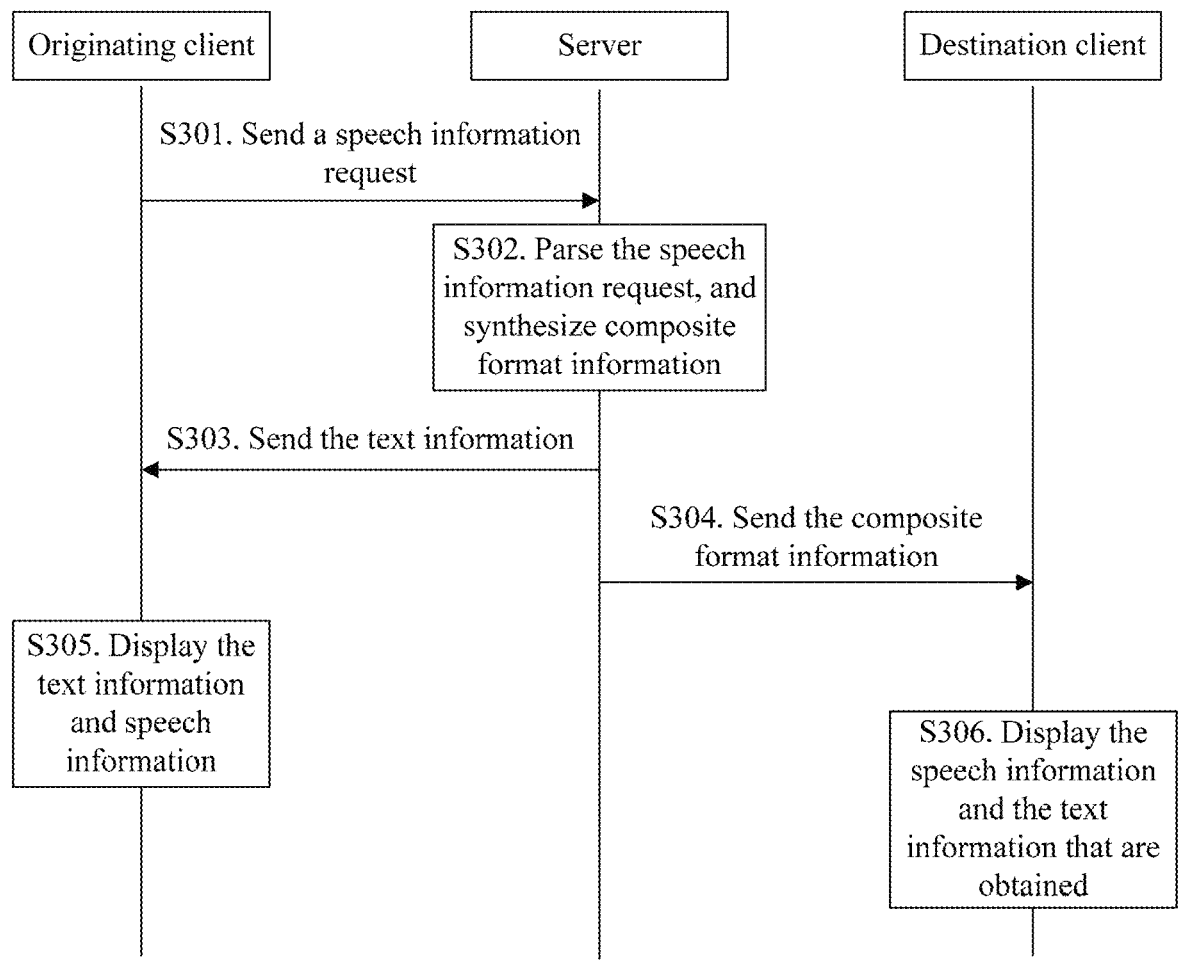
FIG. 3 is a schematic flowchart of a method for displaying speech information according to another embodiment of the present invention.

FIG. 3 is a schematic flowchart of a method for displaying speech information according to another embodiment of the present invention. The embodiment of the method for displaying speech information includes the following steps.

S301. An originating client sends a speech information request to a server.

The speech information request includes prerecorded speech information and destination client information.

The originating client may prerecord a segment of speech information to be sent to a destination client, and when the speech information needs to be sent to the destination client, send the speech information request to the server, where the speech information request carries the speech information and the destination client information.

The destination client information may be specifically a number, an address, a mobile phone number, a nickname, or the like of the client.

S302. The server parses the speech information request, and synthesizes composite format information.

The server parses the speech information carried in the received speech information request to obtain text information corresponding to the speech information. That the server parses the speech information is specifically that the server performs speech recognition according to the speech information to obtain text content corresponding to the speech information.

The server may further determine, according to the recognized text content corresponding to the speech information, a keyword corresponding to the text content, for example, a tag or other feature information corresponding to the speech information. The other feature information corresponding to the speech information may be "angry", "happy", "sad", "anxious", "surprised", or the like that is used to describe a mood of a user. An expression of a user mood may be recognized according to the other feature information corresponding to the speech information and a word used to describe the user mood. This feature may be displayed on the client as an optional information display option. Other feature information corresponding to media information may be replaced or changed. This is not specifically limited in this embodiment of the present invention.

After the server completes parsing of the speech information, the server may obtain the text information corresponding to the speech information, for example, the text content corresponding to the speech information and the keyword corresponding to the text content.

The server may further synthesize the speech information with the text information into the composite format information.

In this embodiment of the present invention, the text information may include the text content, or the keyword, or the text content and the keyword. The keyword may include the tag, or the other feature information corresponding to the speech information, or the tag and the other feature information corresponding to the speech information. The tag is a brief summary of the text content. The other feature information corresponding to the speech information may be specifically a user mood analyzed by the server according to a speech, a speaking speed, an intonation, and a meaning of the speech information, for example, a feature such as "angry", "happy", "sad", or "anxious". This feature may be displayed on the client as an optional information display option. The other feature information corresponding to the speech information may be replaced or changed. This is not specifically limited in this embodiment of the present invention.

For example, the text content corresponding to the speech information is "It is a holiday tomorrow. I invite everyone to dinner".

The tag corresponding to the text content is "invite to dinner".

The other feature information corresponding to the speech information is "happy".

S303. The server sends the text information to the originating client.

S304. The server sends the composite format information to the destination client.

The server recognizes the destination client according to the destination client information carried in the speech information request, and sends the composite format information to the destination client.

S305. The originating client displays the speech information and the text information.

The originating client receives the text information corresponding to the speech information and sent by the server, and displays the speech information and the text information. The text information may include the text content, or the keyword, or the text content and the keyword. The keyword may include the tag, or the other feature information corresponding to the speech information, or the tag and the other feature information corresponding to the speech information.

S306. The destination client displays the speech information and the text information that are obtained.

The destination client receives the composite format information sent by the server, parses the composite format information to obtain the speech information and the text information, and displays the speech information and the text information that are obtained.

The destination client parses the received composite format information to obtain the speech information and the text information corresponding to the speech information. The text information corresponding to the speech information may include the text content, or the keyword, or the text content and the keyword.

In this embodiment of the present invention, the originating client and the destination client may be installed on terminals or mobile terminals such as mobile phones, personal PC computers, or PADs.

In another embodiment of the present invention, when the originating client or the destination client displays information, the client may dynamically process a user interface information display option by means of menu setting or switching according to a user interface display status, or content related to the media information, or a user requirement, so as to display more related information. The user interface information display option includes but is not limited to the media information, the text content corresponding to the media information, the tag corresponding to the text content, the other feature information corresponding to the media information, a user expression corresponding to the text content, a media information sending time, a media information receiving time, a media information length, a media information sender number or address, a media information receiver number or address, the other feature information corresponding to the media information, or the like. In the user interface, not only the information display option is displayed, but also a switching function control can be displayed. The switching function control may be configured to switch between displaying the media information and displaying the media information and the text information corresponding to the media information, and display, in the user interface according to a user operation, the media information, or the media information and the text information corresponding to the media information.

In another embodiment of the present invention, the server synthesizes the speech information and the text information corresponding to the speech information into the composite format information. There may be multiple manners in which the server synthesizes the composite format information and the client parses the composite format information. The following uses two manners as examples.

Manner 1: The composite format information synthesized by the server includes an audio file header 401 with a reserved field, an audio bit stream 402, and an audio extension field 403.

Figure 4:
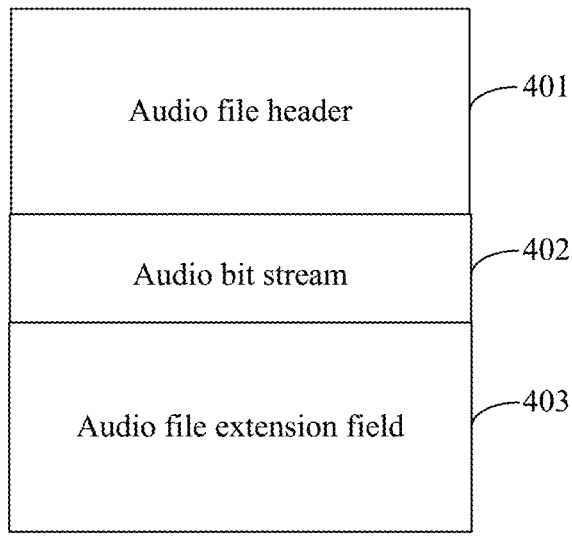
FIG. 4 is a schematic structural diagram of composite format information according to an embodiment of the present invention.

FIG. 4 shows a schematic structural diagram of composite format information according to an embodiment of the present invention. The audio file header with the reserved field is used to identify an offset of the audio extension field in the composite format information. The audio bit stream is the speech information. The audio extension field may include the text information corresponding to the speech information, or the like. The text information corresponding to the speech information may include the text content, or the keyword, or the text content and the keyword. The keyword may include the tag, or the other feature information corresponding to the speech information, or the tag and the other feature information corresponding to the speech information.

The server assigns a value to the reserved field in the audio file header in the composite format information according to the offset of the audio extension field in the composite format information. A length of the reserved field in the audio file header in the composite format information may be set according to a feature of the audio bit stream and a feature of the text information in the audio extension field.

The client receives the composite format information, scans the audio file header in the composite format information, reads information of the reserved field in the audio file header, and obtains the offset of the audio extension field in the composite format information. The client reads the information of the audio extension field according to the obtained offset of the audio extension field in the composite format information. The audio extension field may include the text information corresponding to the speech information, or the like.

Figure 5:
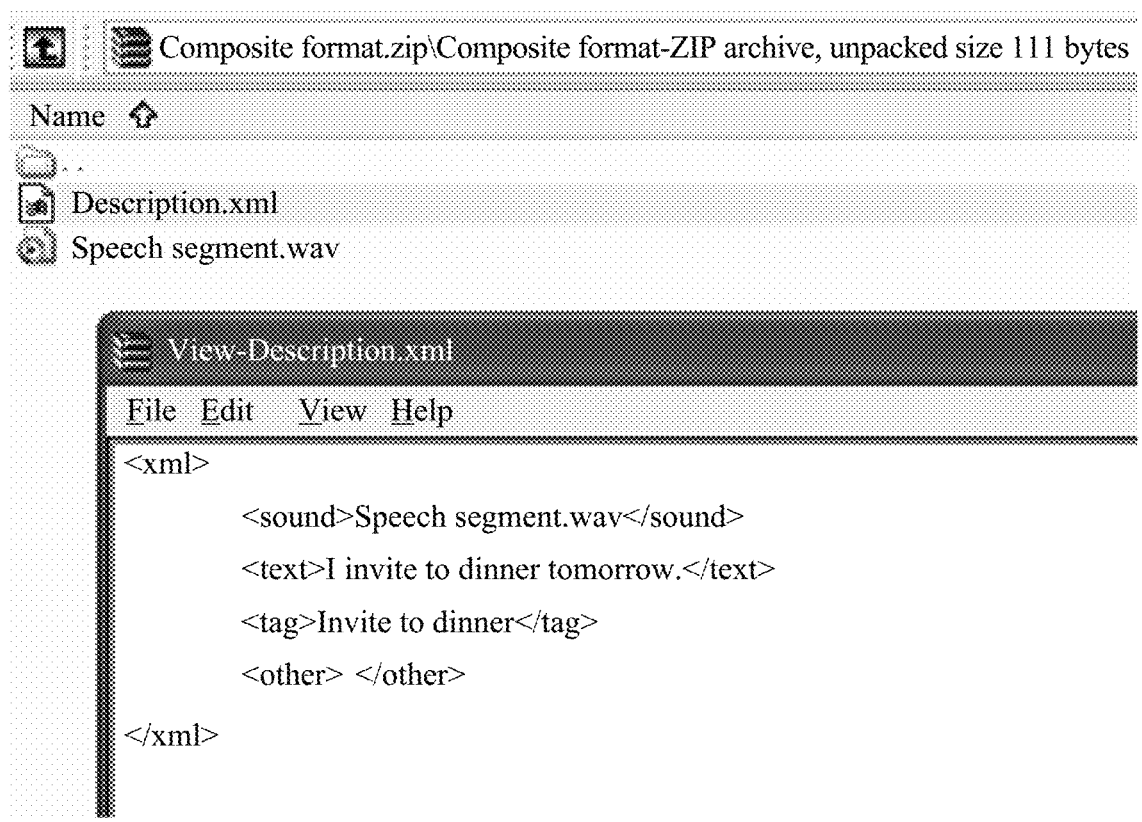
FIG. 5 is an exemplary diagram of composite format information according to another embodiment of the present invention.

Manner 2: FIG. 5 shows an exemplary diagram of composite format information according to another embodiment of the present invention. The composite format information synthesized by the server is a compressed file created by packing and compressing a description file and the speech information together. The description file may include a file name of the speech information, the text information corresponding to the speech information, and the like. The text information corresponding to the speech information may include the text content, or the keyword, or the text content and the keyword. The keyword may include the tag, or the other feature information corresponding to the speech information, or the tag and the other feature information corresponding to the speech information.

The compressed file is specifically a compressed file created by the server by compressing the description file in a .xml format and the speech information in a .wav format into a .zip format.

After the client receives the compressed file in the .zip format that is sent by the server, the client parses the composite format information.

Specifically, the composite format information is parsed as follows: After decompressing the compressed file, the client reads content of the description file "Description.xml": reading a sound node to obtain the file name of the speech information, reading a text node to obtain the text content corresponding to the speech information, reading a tag node to obtain the keyword corresponding to the text content, and reading another node to obtain the other feature information corresponding to the speech information.

In this embodiment of the present invention, after the destination client parses the composite format information, the destination client displays the speech information and the text information corresponding to the speech information simultaneously. The text information corresponding to the speech information may include the text content, or the keyword, or the text content and the keyword. The keyword may include the tag, or the other feature information corresponding to the speech information, or the tag and the other feature information corresponding to the speech information.

Figure 6A:
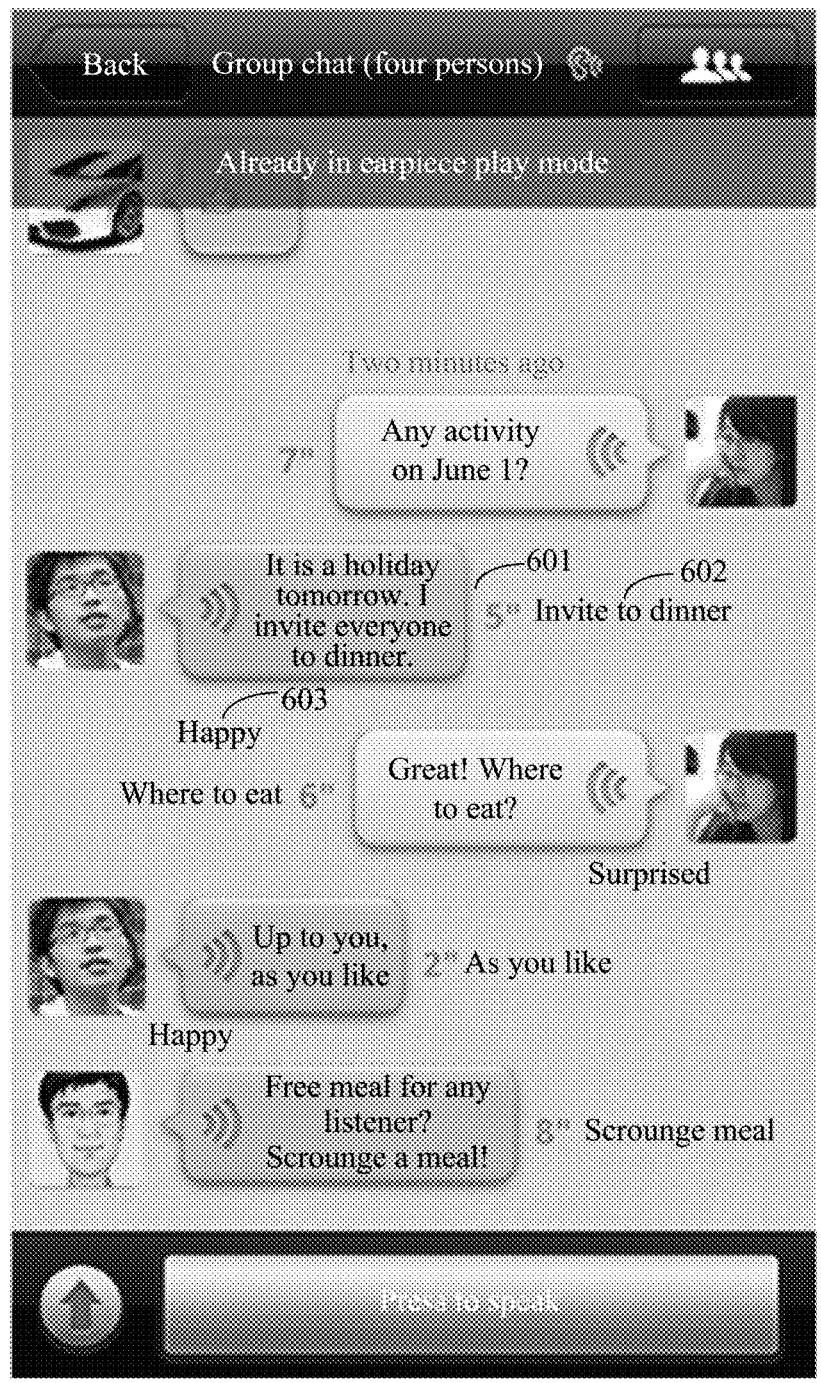
FIG. 6A is a schematic diagram of a user interface for displaying speech information according to an embodiment of the present invention.

FIG. 6A shows a schematic diagram of a user interface for displaying speech information on a terminal according to an embodiment of the present invention. In the display user interface of the terminal, the received speech information and the text information corresponding to the speech information are displayed simultaneously. The displayed text information may include at least one of the following: the text content corresponding to the speech information, the tag corresponding to the text content, a speech information sending time, a speech information receiving time, a speech information length, speech information sender information, speech information receiver information, or a display effect of the other feature information corresponding to the speech information on the terminal.

In the display user interface shown in FIG. 6A, the information displayed to the user includes: the speech information, the text content corresponding to the speech information, the tag corresponding to the text content, and other features corresponding to the speech information. The text content 601 corresponding to the speech information is "It is a holiday tomorrow. I invite everyone to dinner". The tag 602 corresponding to the text content is "invite to dinner". The other feature information 603 corresponding to the speech information is "happy".

Figure 6B:
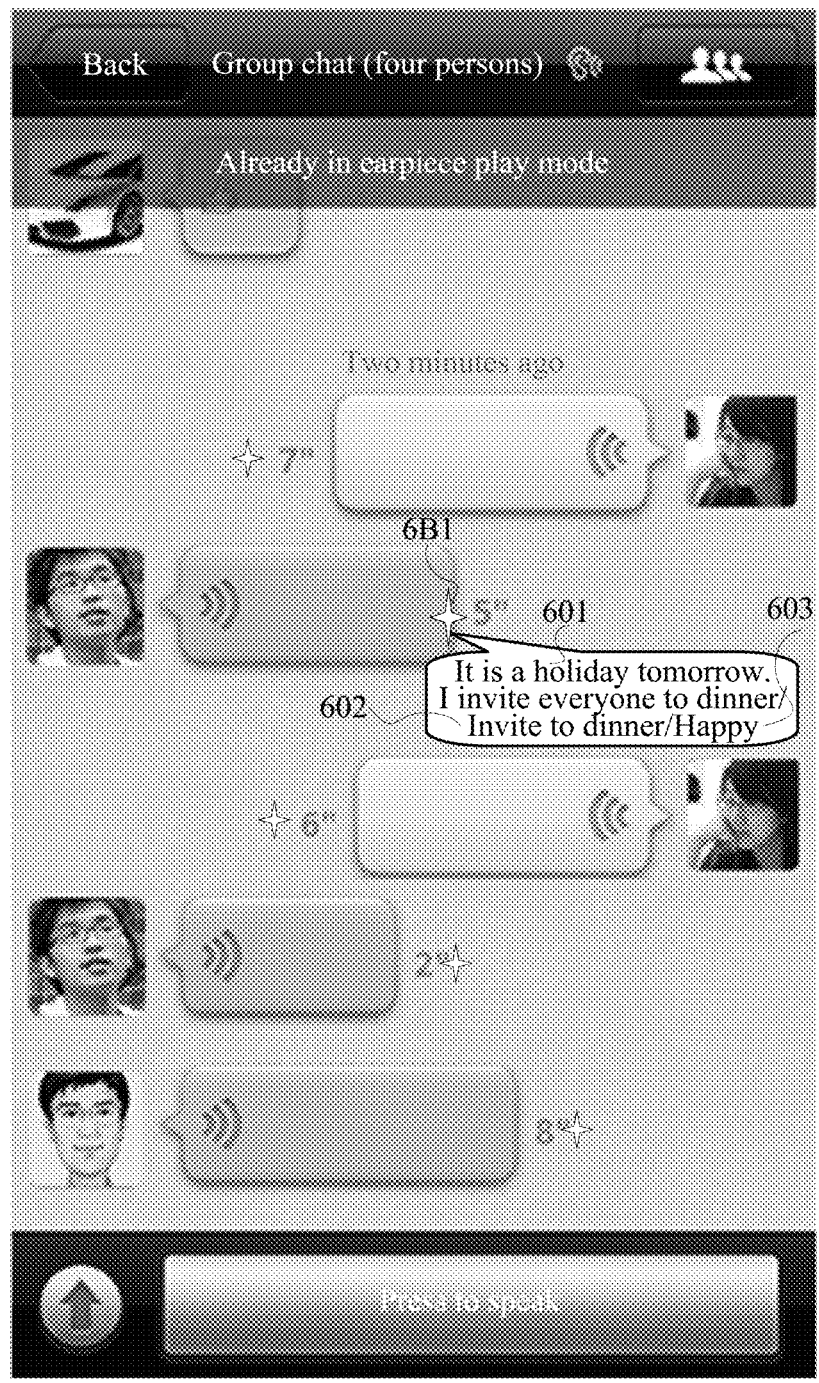
FIG. 6B is a schematic diagram of a user interface for displaying speech information according to an embodiment of the present invention.

Optionally, FIG. 6B shows a schematic diagram of a user interface for displaying speech information on a terminal according to another embodiment of the present invention. A switching function control 6B1 may be set in the display user interface. The media information, or the media information and the text information corresponding to the media information may be displayed according to a user operation. The displayed text information may include at least one of the following: the text content corresponding to the speech information, the tag corresponding to the text content, a speech information sending time, a speech information receiving time, a speech information length, speech information sender information, speech information receiver information, or a display effect of the other feature information corresponding to the speech information on the terminal.

In the display user interface shown in FIG. 6B, the switching function control 6B1 is set in the display user interface, and the information displayed to the user includes: the speech information, the text content corresponding to the speech information, the tag corresponding to the text content, and other features corresponding to the speech information. The text content 601 corresponding to the speech information is "It is a holiday tomorrow. I invite everyone to dinner". The tag 602 corresponding to the text content is "invite to dinner". The other feature information 603 corresponding to the speech information is "happy". According to the user operation, the switching function control is clicked, and the media information, or the media information and the text information corresponding to the media information may be displayed in the user interface.

In the embodiment of the method for displaying speech information according to the present invention, a server receives speech information, parses the speech information to obtain corresponding text information, synthesizes the speech information with the text information to obtain composite format information, and sends the composite format information to a destination client. Finally, the destination client displays the speech information and the text information in a display user interface simultaneously, and communication records can be visually displayed to a user. It is avoided that the user has to click speech links of all speech information repeatedly to browse the communication records. In the method for displaying speech information according to this embodiment of the present invention, the destination client displays the speech information and the text information simultaneously, and by browsing the text information, the user can browse speech information content quickly and visually. In this way, storage space and processes occupied on a terminal may be reduced, consumption of CPU resources is reduced, and efficiency of obtaining the speech information content is improved. Better user experience is provided for the user, and practical applicability is high.

Figure 7:
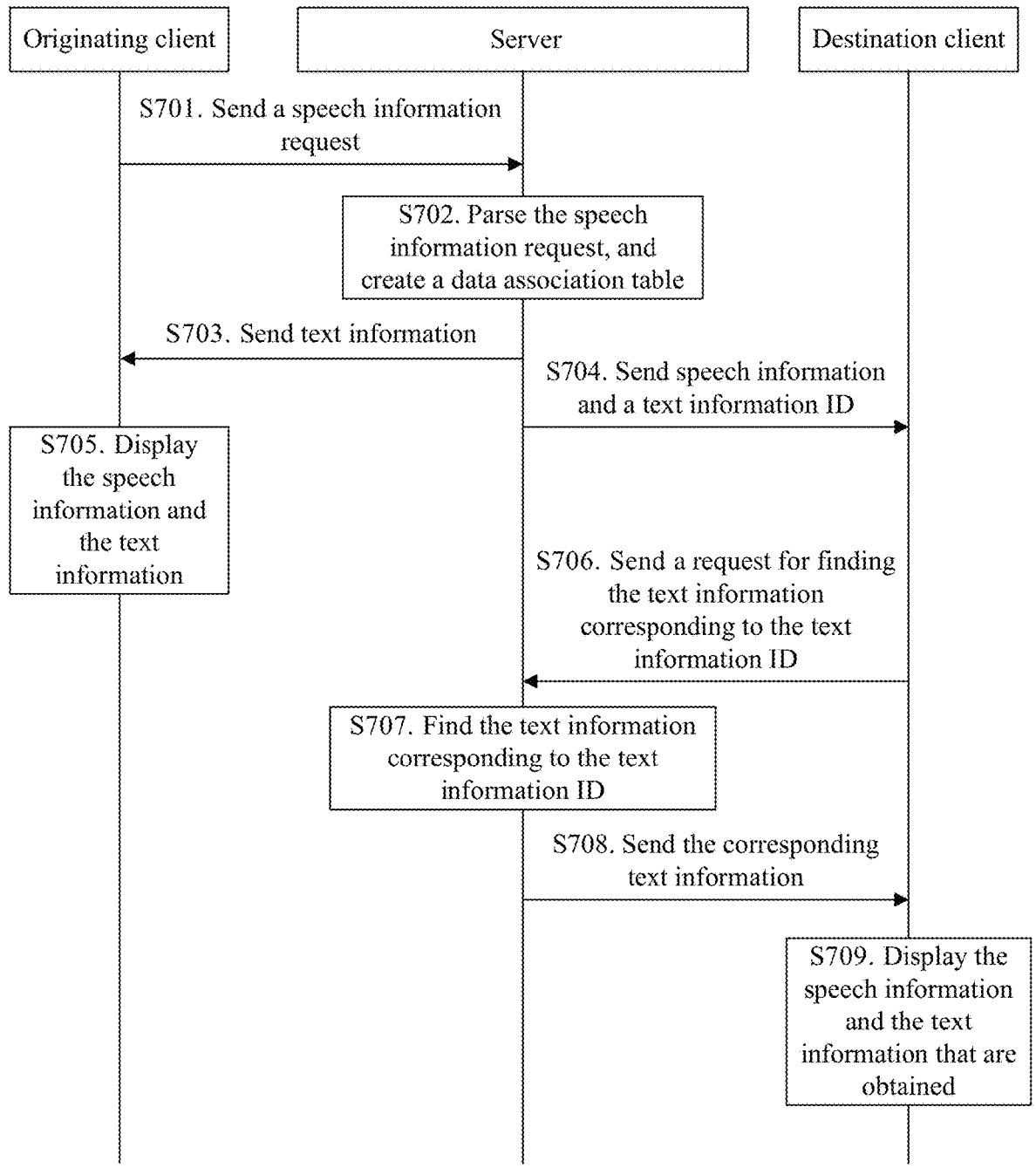
FIG. 7 is a schematic flowchart of a method for displaying speech information according to another embodiment of the present invention.

FIG. 7 is a schematic flowchart of a method for displaying speech information according to another embodiment of the present invention. The embodiment of the method for displaying speech information includes the following steps.

S701. An originating client sends a speech information request to a server.

The speech information request includes prerecorded speech information and destination client information.

The originating client may prerecord a segment of speech information to be sent to a destination client, and when the speech information needs to be sent to the destination client, send the speech information request to the server, where the speech information request carries the speech information and the destination client information.

The destination client information may be specifically a number, an address, a mobile phone number, a nickname, or the like of the client.

S702. The server parses the speech information request, and creates a data association table.

The server parses the speech information carried in the received speech information request to obtain text information corresponding to the speech information. That the server parses the speech information is specifically that the server performs speech recognition according to the speech information to obtain text content corresponding to the speech information.

The server may further determine, according to the recognized text content corresponding to the speech information, a keyword corresponding to the text content, for example, a tag or other feature information corresponding to the speech information. The other feature information corresponding to the speech information may be "angry", "happy", "sad", "anxious", or the like that is used to describe a mood of a user. An expression of a user mood may be recognized according to the other feature information corresponding to the speech information and a word used to describe the user mood. This feature may be displayed on the client as an optional information display option. Other feature information corresponding to media information may be replaced or changed. This is not specifically limited in this embodiment of the present invention.

After the server completes parsing of the speech information, the server may obtain the text information corresponding to the speech information, for example, the text content corresponding to the speech information and the keyword corresponding to the text content.

The server may further create a data association table, and establish an association relationship between a text information identifier (ID) and the text information. As shown in the association table between the text information ID and the text information in Table 1, a search may be performed in the association table between the text information ID and the text information according to a text information ID 00000001 to obtain corresponding text information, including text content "It is a holiday tomorrow. I invite everyone to dinner" corresponding to the speech information, a tag "invite to dinner" corresponding to the text content, and feature information "happy" corresponding to the speech information. A search may be performed in the association table between the text information ID and the text information according to a text information ID 00000002 to obtain corresponding text information, including text content "Great! Where to eat?" corresponding to the speech information, a tag "where to eat?" corresponding to the text content, and feature information "surprised" corresponding to the speech information. A search may be performed in the association table between the text information ID and the text information according to a text information ID 00000003 to obtain corresponding text information, including text content "Up to you, as you like" corresponding to the speech information, a tag "as you like" corresponding to the text content, and feature information "happy" corresponding to the speech information. A search may be performed in the association table between the text information ID and the text information according to a text information ID 00000004 to obtain corresponding text information, including text content "Free meal for any listener? Scrounge a meal!" corresponding to the speech information, a tag "scrounge meal" corresponding to the text content, and feature information "null" corresponding to the speech information.

TABLE 1

| Text information ID | Text information |
| --- | --- |
| 00000001 | It is a holiday tomorrow. I invite everyone to dinner/Invite to dinner/Happy |
| 00000002 | Great! Where to eat?/Where to eat?/Surprised |
| 00000003 | Up to you, as you like/As you like/Happy |
| 00000004 | Free meal for any listener? Scrounge a meal!/Scrounge meal/Null |
| ... | ... |

In this embodiment of the present invention, the text information may include the text content, or the keyword, or the text content and the keyword. The keyword may include the tag, or the other feature information corresponding to the speech information, or the tag and the other feature information corresponding to the speech information. The tag is a brief summary of the text content. The other feature information corresponding to the speech information may be specifically a user mood analyzed by the server according to a speech, a speaking speed, an intonation, and a meaning of the speech information, for example, a feature such as "angry", "happy", "sad", or "anxious". This feature may be displayed on the client as an optional information display option. The other feature information corresponding to the speech information may be replaced or changed. This is not specifically limited in this embodiment of the present invention.

For example, the text content corresponding to the speech information is "It is a holiday tomorrow. I invite everyone to dinner".

The tag corresponding to the text content is "invite to dinner".

The other feature information corresponding to the speech information is "happy".

S703. The server sends the text information to the originating client.

S704. The server sends the speech information and the text information ID to a destination client.

The server recognizes the destination client according to the destination client information carried in the speech information request, and sends the speech information and the text information ID to the destination client.

S705. The originating client displays the speech information and the text information.

The originating client receives the text information corresponding to the speech information and sent by the server, and displays the speech information and the text information.

S706. The destination client sends, to the server, a request for finding the text information corresponding to the text information ID.

The destination client receives the speech information and the text information ID that are sent by the server, and sends, to the server, the request for finding the text information corresponding to the text information ID.

S707. The server finds the text information corresponding to the text information ID.

Table 1 is the data association table between the text information ID and the corresponding text information. As shown in Table 1, that the server finds the text information corresponding to the text information ID is specifically: the server searches the local data association table on the server according to the received text information ID to find the association relationship between the text information ID and the text information corresponding to the speech information, and retrieves the text information corresponding to the speech information.

S708. The server sends the text information to the destination client.

The server sends, to the destination client, the retrieved text information corresponding to the speech information.

S709. The destination client displays the speech information and the text information that are obtained.

The destination client receives the text information retrieved and sent by the server, and displays the speech information and the text information that are obtained. The text information may include the text content, or the keyword, or the text content and the keyword.

In this embodiment of the present invention, the originating client and the destination client may be installed on terminals or mobile terminals such as mobile phones, personal PC computers, or PADs.

In another embodiment of the present invention, when the originating client or the destination client displays information, the client may dynamically process a user interface information display option by means of menu setting or switching according to a user interface display status, or content related to the media information, or a user requirement, so as to display more related information. The user interface information display option includes but is not limited to the media information, the text content corresponding to the media information, the tag corresponding to the text content, the other feature information corresponding to the media information, a user expression corresponding to the text content, a media information sending time, a media information receiving time, a media information length, a media information sender number or address, a media information receiver number or address, the other feature information corresponding to the media information, or the like. In the user interface, not only the information display option is displayed, but also a switching function control can be displayed. The switching function control may be configured to switch between displaying the media information and displaying the media information and the text information corresponding to the media information, and display, in the user interface according to a user operation, the media information, or the media information and the text information corresponding to the media information.

In the embodiment of the method for displaying speech information according to the present invention, a server receives speech information, parses the speech information to obtain corresponding text information, establishes an association relationship between a text information ID and the text information, and sends the speech information and the text information ID to a destination client. Finally, the destination client displays the speech information and the text information in a display user interface simultaneously, and communication records can be visually displayed to a user. It is avoided that the user has to click speech links of all speech information repeatedly to browse the communication records. In the manner of displaying speech information according to this embodiment of the present invention, an originating client quickly displays the text information, and the destination client quickly displays the speech information and asynchronously displays the text information. The destination client displays the speech information and the text information simultaneously. The user can browse the text information corresponding to the speech information. By browsing the text information, the user can browse speech information content quickly and visually. In this way, storage space and processes occupied on a terminal may be reduced, consumption of CPU resources is reduced, and efficiency of obtaining the speech information content is improved. Better user experience is provided for the user, and practical applicability is high.

Figure 8:
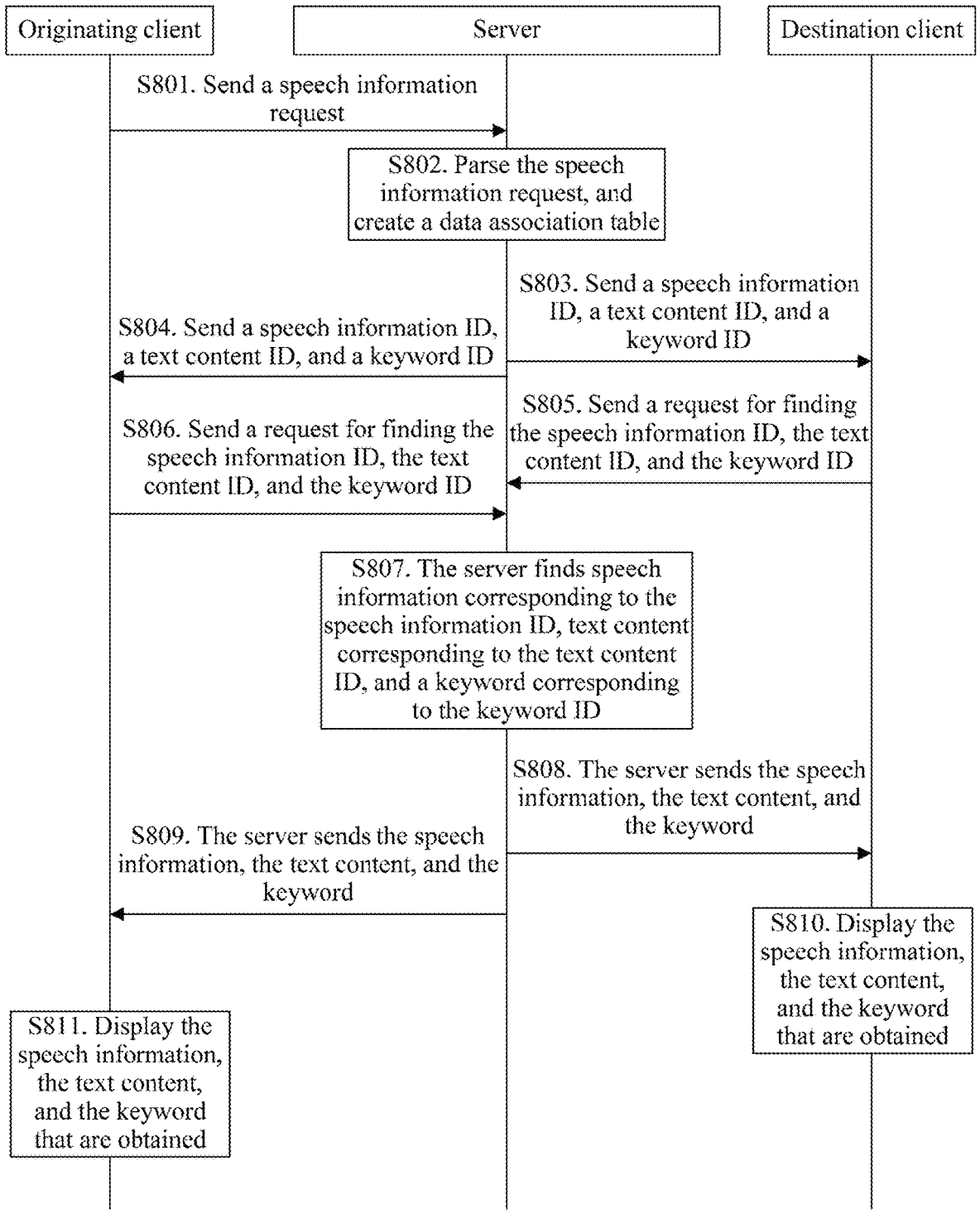
FIG. 8 is a schematic flowchart of a method for displaying speech information according to another embodiment of the present invention.

FIG. 8 is a schematic flowchart of a method for displaying speech information according to another embodiment of the present invention. The embodiment of the method for displaying speech information includes the following steps.

S801. An originating client sends a speech information request to a server.

The speech information request includes prerecorded speech information and destination client information.

The originating client may prerecord a segment of speech information to be sent to a destination client, and when the speech information needs to be sent to the destination client, send the speech information request to the server, where the speech information request carries the speech information and the destination client information.

The destination client information may be specifically a number, an address, a mobile phone number, a nickname, or the like of the client.

S802. The server parses the speech information request, and creates a data association table.

The server parses the speech information carried in the received speech information request to obtain text information corresponding to the speech information. That the server parses the speech information is specifically that the server performs speech recognition according to the speech information to obtain text content corresponding to the speech information.

The server may further determine, according to the recognized text content corresponding to the speech information, a keyword corresponding to the text content, for example, a tag or other feature information corresponding to the speech information. The other feature information corresponding to the speech information may be "angry", "happy", "sad", "anxious", "surprised", or the like that is used to describe a mood of a user. An expression of a user mood may be recognized according to the other feature information corresponding to the speech information and a word used to describe the user mood. This feature may be displayed on the client as an optional information display option. Other feature information corresponding to media information may be replaced or changed. This is not specifically limited in this embodiment of the present invention.

After the server completes parsing of the speech information, the server may obtain the text information corresponding to the speech information, for example, the text content corresponding to the speech information and the keyword corresponding to the text content.

The server may further create a data association table, and separately establish association relationships between a speech information ID and the speech information, a text content ID and the text content, and a keyword ID and the keyword. A form of the association table is not limited in the present invention. For example, an association table may be created in a form shown in the following table. For an association table between the speech information ID and the speech information, refer to Table 2. For an association table between the text content ID and the text content, refer to Table 3. For an association table between the keyword ID and the keyword, refer to Table 4. The association tables between the speech information ID and the speech information, the text content ID and the text content, and the keyword ID and the keyword may be maintained in one table, or may be maintained separately.

TABLE 2

| Speech information ID | Speech information |
|---|---|
| 01 | Speech information 1 |
| 02 | Speech information 2 |
| 03 | Speech information 3 |
| 04 | Speech information 4 |
| ... | ... |

TABLE 3

| Text content ID | Text content |
|---|---|
| 001 | It is a holiday tomorrow. I invite everyone to dinner. |
| 002 | Great! Where to eat? |
| 003 | Up to you, as you like. |
| 004 | Free meal for any listener? Scrounge a meal! |
| ... | ... |

TABLE 4

| IDKeyword ID | Keyword |
|---|---|
| 0001 | Happy |
| 0002 | Surprised |
| 0003 | Happy |
| 004 | Null |
| ... | ... |

In this embodiment of the present invention, the text information may include the text content, or the keyword, or the text content and the keyword. The keyword may include the tag, or the other feature information corresponding to the speech information, or the tag and the other feature information corresponding to the speech information. The tag is a brief summary of the text content. The other feature information corresponding to the speech information may be specifically a user mood analyzed by the server according to a speech, a speaking speed, an intonation, and a meaning of the speech information, for example, a feature such as "angry", "happy", "sad", or "anxious". This feature may be displayed on the client as an optional information display option. The other feature information corresponding to the speech information may be replaced or changed. This is not specifically limited in this embodiment of the present invention.

For example, the text content corresponding to the speech information is "It is a holiday tomorrow. I invite everyone to dinner".

The tag corresponding to the text content is "invite to dinner".

The other feature information corresponding to the speech information is "happy".

S803. The server sends the speech information ID, the text content ID, and the keyword ID to a destination client.

The server recognizes the destination client according to the destination client information carried in the speech information request, and sends the speech information ID, the text information ID, and the keyword ID to the destination client.

S804. The server sends the speech information ID, the text content ID, and the keyword ID to the originating client.

Optionally, because the speech information already exists on the originating client, to reduce a load capability of the server and avoid large consumption of resources on the server, the server may not send the speech information ID to the originating client, but sends only the text content ID and the keyword ID.

Optionally, when processing information, the server performs an operation in a manner of batch packing processing. The server may send the speech information ID, the text content ID, and the keyword ID to the originating client simultaneously.

S805. The destination client sends, to the server, a request for finding the speech information ID, the text content ID, and the keyword ID.

The destination client receives the speech information ID, the text content ID, and the keyword ID that are sent by the server, and sends, to the server, the request for finding the speech information ID, the text content ID, and the keyword ID.

S806. The originating client sends, to the server, a request for finding the speech information ID, the text content ID, and the keyword ID.

Optionally, because sending a search request to the server causes large consumption of resources on the server, and the speech information already exists on the originating client, the originating client may not send a request for finding the speech information ID to the server, but sends only a request for the text content ID and the keyword ID.

S807. The server finds speech information corresponding to the speech information ID, text content corresponding to the text content ID, and a keyword corresponding to the keyword ID.

Table 2 is the data association table between the speech information ID and the corresponding speech information. Table 3 is the data association table between the text content ID and the corresponding text content. Table 4 is the data association table between the keyword ID and the corresponding keyword. As shown in Table 2, Table 3, and Table 4, that the server finds speech information corresponding to the speech information ID, text content corresponding to the text content ID, and a keyword corresponding to the keyword ID is specifically: the server separately searches the local data association table on the server according to the received speech information ID, text content ID, and keyword ID to find the association relationships between the speech information ID and the speech information, the text content ID and the text content, and the keyword ID and the keyword, and retrieves the speech information, the text content corresponding to the speech information, and the keyword corresponding to the text content.

S808. The server sends the speech information, the text content, and the keyword to the destination client separately.

The server sends, to the destination client, the speech information, the text content corresponding to the speech information, and the keyword corresponding to the text content that are retrieved.

S809. The server sends the speech information, the text content, and the keyword to the originating client separately.

The server sends, to the originating client, the speech information, the text content corresponding to the speech information, and the keyword corresponding to the text content that are retrieved.

S810. The destination client displays the speech information, the text content, and the keyword that are obtained.

The destination client receives the text information retrieved and sent by the server, and displays the speech information, the text content, and the keyword that are obtained. When displaying the text content and the keyword, the destination client may display at least one thereof.

S811. The originating client displays the speech information, the text content, and the keyword that are obtained.

The originating client receives the text information retrieved and sent by the server, and displays the speech information, the text content, and the keyword that are obtained. When displaying the text content and the keyword, the originating client may display at least one thereof.

In another embodiment of the present invention, there is no sequence between step S803 and step S804 performed by the server. Step S803 may be performed first, or step S804 may be performed first, or step S803 and step S804 may be performed simultaneously.

In another embodiment of the present invention, there is no sequence between step S805 performed by the destination client and step S806 performed by the originating client. The destination client may perform step S805 first, or the originating client may perform step S806 first, or the two steps are performed simultaneously.

In another embodiment of the present invention, there is no sequence between step S808 and step S809 performed by the server. The server may perform step S808 first, or may perform step S809, or may perform the steps simultaneously.

In this embodiment of the present invention, the originating client and the destination client may be installed on terminals or mobile terminals such as mobile phones, personal PC computers, or PADs.

In another embodiment of the present invention, when the originating client or the destination client displays information, the client may dynamically process a user interface information display option by means of menu setting or switching according to a user interface display status, or content related to the media information, or a user requirement, so as to display more related information. The user interface information display option includes but is not limited to the media information, the text content corresponding to the media information, the tag corresponding to the text content, the other feature information corresponding to the media information, a user expression corresponding to the text content, a media information sending time, a media information receiving time, a media information length, a media information sender number or address, a media information receiver number or address, the other feature information corresponding to the media information, or the like. In the user interface, not only the information display option is displayed, but also a switching function control can be displayed. The switching function control may be configured to switch between displaying the media information and displaying the media information and the text information corresponding to the media information, and display, in the user interface according to a user operation, the media information, or the media information and the text information corresponding to the media information.

In the embodiment of the method for displaying speech information according to the present invention, a server receives speech information, parses the speech information to obtain corresponding text information, establishes association relationships between a speech information ID and the speech information, a text content ID and text content, and a keyword ID and a keyword, and sends the speech information ID, the text content ID, and the keyword ID to a destination client. Finally, the destination client displays the speech information and the text information in a display user interface simultaneously, and communication records can be visually displayed to a user. It is avoided that the user has to click speech links of all speech information repeatedly to browse the communication records. In the manner of displaying speech information according to this embodiment of the present invention, functional modules of a terminal bearing a client are simplified, and association relationships are established between the speech information ID and the speech information, the text content ID and the text content, and the keyword ID and the keyword. The client sends a query request to the server according to each ID, and asynchronously displays the speech information and the text information. This facilitates distributed deployment and load balancing of the server. An originating client quickly displays the text information, and the destination client quickly displays the speech information and asynchronously displays the text information. The destination client displays the speech information and the text information simultaneously. The user can browse the text information corresponding to the speech information. By browsing the text information, the user can browse speech information content quickly and visually. In this way, storage space and processes occupied on the terminal may be reduced, consumption of CPU resources is reduced, and efficiency of obtaining the speech information content is improved. Better user experience is provided for the user, and practical applicability is high.

Figure 9:
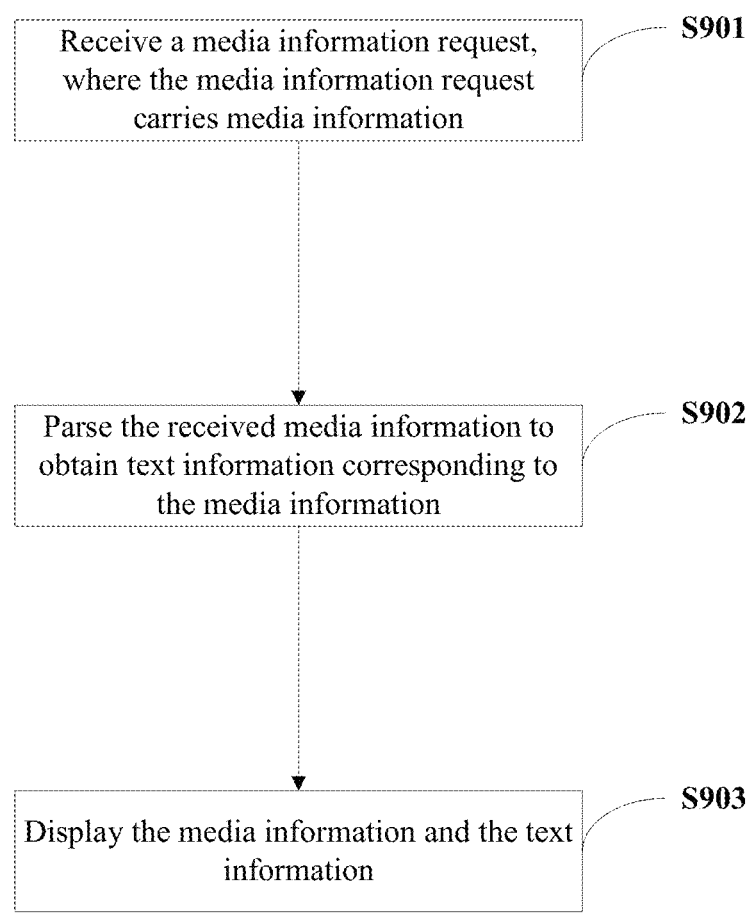
FIG. 9 is a schematic flowchart of a method for displaying media information according to another embodiment of the present invention.

FIG. 9 is a schematic flowchart of a method for displaying media information according to another embodiment of the present invention. As shown in FIG. 9, the embodiment of the method for displaying media information includes the following steps.

S901. Receive a media information request, where the media information request carries media information.

The media information may be audio information, video information, or the like.

The receiving a media information request, where the media information request carries media information, may be specifically performed by a server, or may be performed by a client.

S902. Parse the received media information to obtain text information corresponding to the media information.

The parsing the received media information to obtain text information corresponding to the media information is specifically: performing media recognition according to the media information to obtain text content corresponding to the media information.

A keyword corresponding to the text content, for example, a tag or other feature information corresponding to the media information, may be further determined according to the recognized text content corresponding to the media information. The other feature information corresponding to the media information may be "angry", "happy", "sad", "anxious", "surprised", or the like that is used to describe a mood of a user. An expression of a user mood may be recognized according to other feature information corresponding to speech information and a word used to describe the user mood. This feature may be displayed on the client as an optional information display option. The other feature information corresponding to the media information may be replaced or changed. This is not specifically limited in this embodiment of the present invention.

After the parsing the media information is complete, the text information corresponding to the media information, for example, the text content corresponding to the media information and the keyword corresponding to the text content, may be obtained.

In this embodiment of the present invention, the text information may include the text content, or the keyword, or the text content and the keyword. The keyword may include the tag, or the other feature information corresponding to the media information, or the tag and the other feature information corresponding to the media information. The tag is a brief summary of the text content. The other feature information corresponding to the media information may be specifically a user mood analyzed by the server according to media, a speaking speed, an intonation, and a meaning of the media information, for example, a feature such as "angry", "happy", "sad", "anxious", or "surprised". This feature may be displayed on the client as an optional information display option. The other feature information corresponding to the media information may be replaced or changed. This is not specifically limited in this embodiment of the present invention.

For example, the text content corresponding to the media information is "It is a holiday tomorrow. I invite everyone to dinner".

The tag corresponding to the text content is "invite to dinner".

The other feature information corresponding to the media information is "happy".

The parsing the received media information to obtain text information corresponding to the media information may be specifically performed by the server, or may be performed by the client.

S903. Display the media information and the text information.

When displaying information, the client may dynamically process a user interface information display option by means of menu setting or switching according to a user interface display status, or content related to the media information, or a user requirement, so as to display more related information. The user interface information display option includes but is not limited to the media information, the text content corresponding to the media information, the tag corresponding to the text content, the other feature information corresponding to the media information, a user emotion corresponding to the text content, a media information sending time, a media information receiving time, a media information length, a media information sender number or address, a media information receiver number or address, the other feature information corresponding to the media information, or the like.

Optionally, in the user interface, not only the information display option is displayed, but also the media information, or the media information and the text information may be displayed according to a switching instruction. A switching function control can be displayed in the user interface. The switching function control may be configured to switch between displaying the media information and displaying the media information and the text information corresponding to the media information, and display, in the user interface according to a user operation, the media information, or the media information and the text information corresponding to the media information.

In the embodiment of the method for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 10:
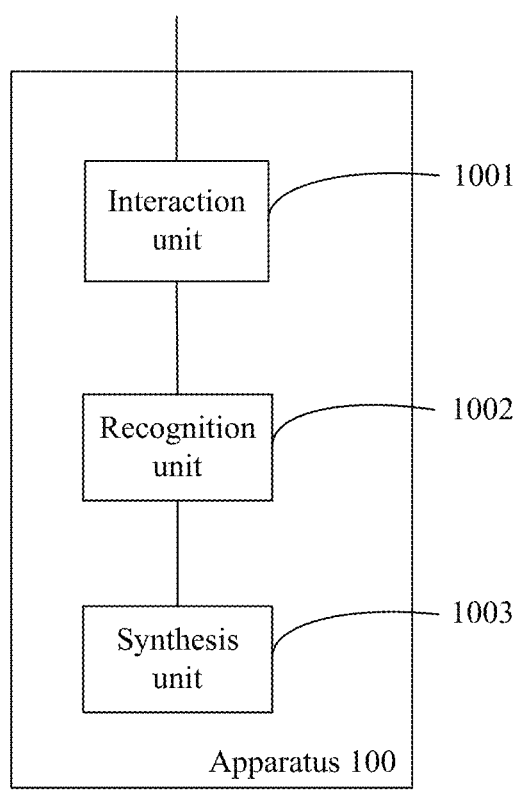
FIG. 10 is a schematic diagram of an apparatus 100 for displaying media information according to an embodiment of the present invention.

FIG. 10 is a schematic diagram of an apparatus 100 for displaying media information according to an embodiment of the present invention. As shown in FIG. 10, the apparatus 100 includes an interaction unit 1001, a recognition unit 1002, and a synthesis unit 1003.

The interaction unit 1001 receives a media information request sent by an originating client, where the media information request carries media information and destination client information, and is further configured to send composite information to a destination client according to the destination client information carried in the media information request.

The recognition unit 1002 parses the media information carried in the received media information request to obtain text information corresponding to the media information.

The synthesis unit 1003 synthesizes information related to the media information with information related to the text information to obtain the composite information.

In this embodiment of the present invention, the recognition unit 1002 parses the media information carried in the received media information request to obtain the text information corresponding to the media information. That the recognition unit 1002 parses the media information is specifically that the recognition unit 1002 performs media recognition according to the media information to obtain text content corresponding to the media information. The recognition unit 1002 may further determine, according to the recognized text content corresponding to the media information, a keyword corresponding to the text content.

In another embodiment of the present invention, the synthesis unit 1003 may further synthesize the media information with the text information into composite format information. That the interaction unit 1001 sends composite information to a destination client according to the destination client information carried in the media information request is specifically that the interaction unit 1001 sends the composite format information synthesized by the synthesis unit 1003 to the destination client according to the destination client information carried in the media information request.

By using the apparatus for displaying media information, the destination client and the originating client display the media information and the text information, and implement a media information display process. For brevity, details are not described again.

In the embodiment of the apparatus for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 11:
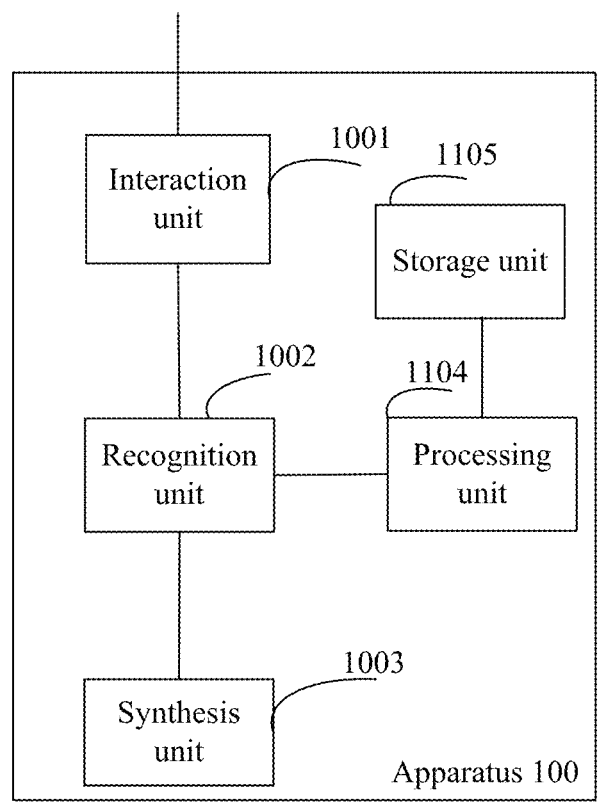
FIG. 11 is a schematic diagram of an apparatus 100 for displaying media information according to another embodiment of the present invention.

FIG. 11 is a schematic diagram of an apparatus 100 for displaying media information according to another embodiment of the present invention. As shown in FIG. 11, the apparatus 100 may further include a processing unit 1104 and a storage unit 1105.

The processing unit 1104 may create a data association table, and establish an association relationship between a text information identifier and the text information.

The interaction unit 1001 may further receive a request sent by the client for querying the text information identifier.

The storage unit 1105 may store the data association table of the association relationship between the text information identifier and the text information.

The interaction unit 1001 may further send the text information to the originating client and the destination client.

In this embodiment of the present invention, the recognition unit 1002 parses the media information carried in the received media information request to obtain the text information corresponding to the media information; the processing unit 1104 creates the data association table according to the text information corresponding to the media information and obtained by the recognition unit 1002 by parsing, and establishes the association relationship between the text information identifier and the text information; the interaction unit 1001 sends, to the destination client, the composite information that is obtained by the synthesis unit 1003 by synthesizing the media information with the text information identifier; the interaction unit 1001 receives the request sent by the client for querying the text information identifier, and searches the data association table stored in the storage unit 1105 to find the text information corresponding to the text information identifier; and the interaction unit 1001 sends, to the destination client, the text information found in the storage unit 1105.

In another embodiment of the present invention, the processing unit 1104 may create a data association table, and establish association relationships between a media information identifier and the media information, a text content identifier and the text content, and a keyword identifier and the keyword.

The interaction unit 1001 may further receive a request sent by the client for querying the media information identifier, the text content identifier, and the keyword identifier.

The storage unit 1105 may further store the data association table of the association relationships between the media information identifier and the media information, the text content identifier and the text content, and the keyword identifier and the keyword.

The interaction unit 1001 may further send the media information, the text content, and the keyword to the originating client and the destination client.

In the another embodiment of the present invention, the recognition unit 1002 parses the media information carried in the received media information request to obtain the text information corresponding to the media information; the processing unit 1104 creates the data association table according to the text information corresponding to the media information and obtained by the recognition unit 1002 by parsing, and establishes the association relationships between the media information identifier and the media information, the text content identifier and the text content, and the keyword identifier and the keyword; the interaction unit 1001 sends, to the destination client, the composite information that is obtained by the synthesis unit 1003 by synthesizing the media information identifier with the text content identifier and the keyword identifier; the interaction unit 1001 receives the request sent by the client for querying the media information identifier, the text content identifier, and the keyword identifier, and searches the data association table stored in the storage unit 1105 to find the media information corresponding to the media information identifier, the text content corresponding to the text content identifier, and the keyword corresponding to the keyword identifier; and the interaction unit 1001 sends, to the destination client, the media information, the text content, and the keyword that are found in the storage unit 1105.

By using the apparatus for displaying media information, the destination client and the originating client display the media information and the text information, and implement a media information display process. For brevity, details are not described again.

In the embodiment of the apparatus for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 12:
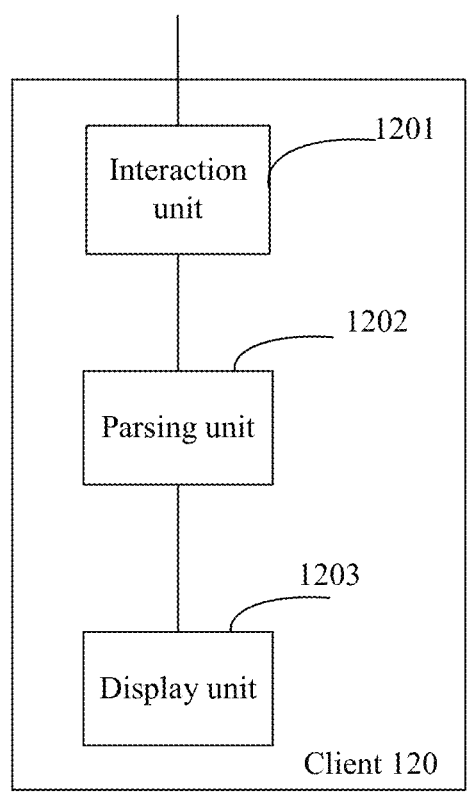
FIG. 12 is a schematic diagram of a client 120 for displaying media information according to another embodiment of the present invention.

FIG. 12 is a schematic diagram of a client 120 for displaying media information according to another embodiment of the present invention. As shown in FIG. 12, the client 120 includes an interaction unit 1201, a parsing unit 1202, and a display unit 1203.

The interaction unit 1201 receives composite information sent by a server, where the composite information is obtained by the server after the server parses received media information to obtain text information and synthesizes the media information with the text information.

The paring unit 1202 parses the composite information to obtain the media information and the text information.

The display unit 1203 displays the media information and the text information.

In another embodiment of the present invention, the interaction unit 1201 may further send a query request to the server, requesting the server to query a data association table to obtain the text information corresponding to the text information identifier, or the media information corresponding to the media information identifier, the text content corresponding to a text content identifier, and the keyword corresponding to a keyword identifier. The interaction unit 1201 may further receive the text information, or the media information, text content, and keyword sent by the server.

When the composite information is composite format information, the parsing unit 1202 parses the composite format information to obtain the media information and the text information; and the display unit 1203 displays the media information and the text information according to the media information and the text information that are obtained by the parsing unit 1202 by parsing.

When the composite information is a combination of the media information and the text information identifier, the parsing unit 1202 parses the obtained text information identifier, and instructs the interaction unit 1201 to send a query request to the server, requesting the server to query the data association table to obtain the text information corresponding to the text information identifier; and the display unit 1203 displays the media information and the text information that are received by the interaction unit 1201.

When the composite information is a combination of the media information identifier, the text content identifier, and the keyword identifier, the parsing unit 1202 parses the obtained media information identifier, text content identifier, and keyword identifier, and instructs the interaction unit 1201 to send a query request to the server, requesting the server to query the data association table to obtain the media information corresponding to the media information identifier, the text content corresponding to the text content identifier, and the keyword corresponding to the keyword identifier; and the display unit 1203 displays the media information, the text content, and the keyword that are received by the interaction unit 1201.

Optionally, the interaction unit 1201 may further receive a switching instruction, and display, according to the switching instruction, the media information, or the media information and the text information.

By using the client for displaying media information, the destination client and an originating client display the media information and the text information, and implement a media information display process. For brevity, details are not described again.

In the embodiment of the apparatus for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 13:
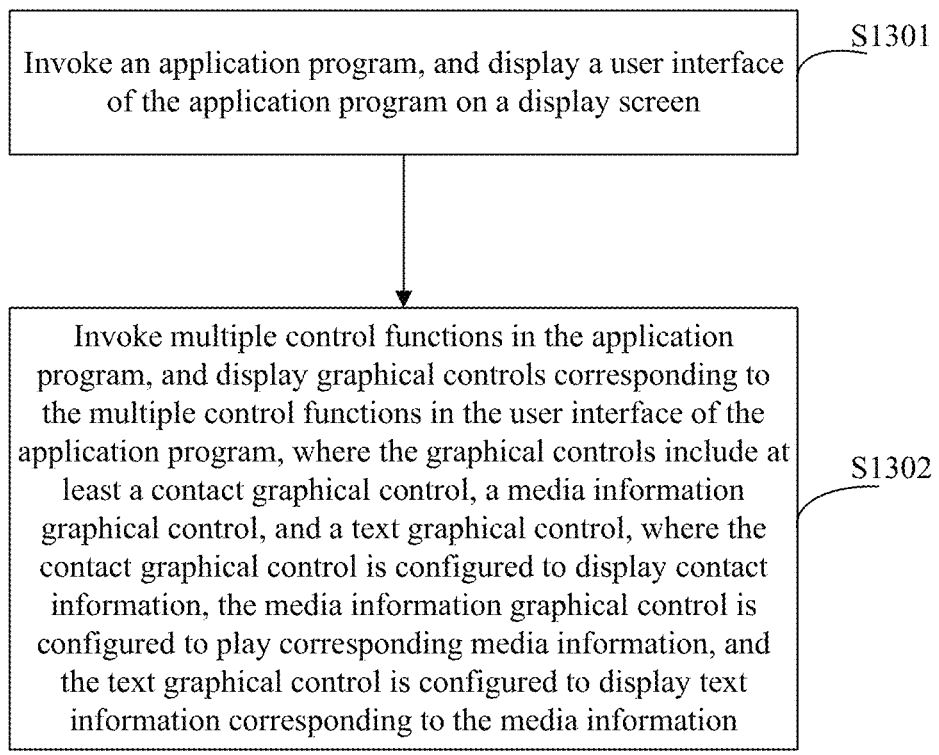
FIG. 13 is a schematic diagram of a method for displaying graphical controls according to an embodiment of the present invention.

FIG. 13 is a schematic diagram of a method for displaying graphical controls according to an embodiment of the present invention. The method for displaying graphical controls is applied to a computer system. The computer system includes a display screen and an application program. The embodiment of the method for displaying graphical controls includes the following steps.

S1301. Invoke the application program, and display a user interface of the application program on the display screen.

S1302. Invoke multiple control functions in the application program, and display graphical controls corresponding to the multiple control functions in the user interface of the application program, where the graphical controls include at least a contact graphical control, a media information graphical control, and a text graphical control, where the contact graphical control is configured to display contact information, the media information graphical control is configured to play corresponding media information, and the text graphical control is configured to display text information corresponding to the media information.

In another embodiment of the present invention, the text graphical control further includes a text content graphical control and/or a keyword graphical control, where the text content graphical control is configured to display text content corresponding to the media information, and the keyword graphical control is configured to display a keyword corresponding to the text content corresponding to the media information.

In this embodiment of the present invention, the keyword may include a tag, or other feature information corresponding to the media information, or a tag and other feature information corresponding to the media information. The tag is a brief summary of the text content. The other feature information corresponding to the media information may be specifically a user mood analyzed by a server according to a speech, a speaking speed, an intonation, and a meaning of the media information, for example, a feature such as "angry", "happy", "sad", or "anxious". This feature may be displayed on a client as an optional information display option. The other feature information corresponding to the media information may be replaced or changed. This is not specifically limited in this embodiment of the present invention.

For example, the text content corresponding to the media information is "It is a holiday tomorrow. I invite everyone to dinner".

The tag corresponding to the text content is "invite to dinner".

The other feature information corresponding to the media information is "happy".

In another embodiment of the present invention, when the multiple control functions in the application program are invoked, and the graphical controls corresponding to the multiple control functions are displayed in the user interface of the application program, a switching function graphical control may be displayed in the user interface of the application program, where the switching function graphical control is configured to receive the switching instruction. According to the switching instruction, switching is performed between displaying the media information graphical control in the user interface of the application program and displaying the media information graphical control and the text graphical control in the user interface of the application program.

In the embodiment of the method for displaying graphical controls according to the present invention, in a computer system, an application program is invoked; contact information, text content, and/or a keyword are/is displayed on a display screen; and communication records can be visually displayed to a user. It is avoided that the user has to click media links of all media information repeatedly to browse the communication records. In the method for displaying graphical controls according to this embodiment of the present invention, a destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 14A:
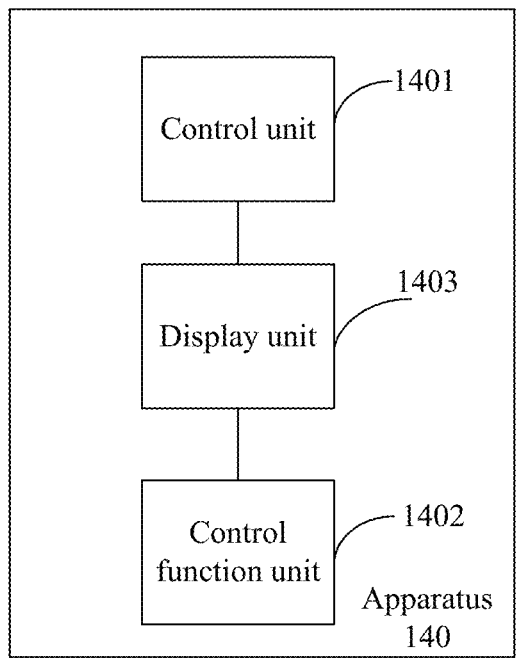
FIG. 14A is a schematic diagram of an apparatus 140 for displaying graphical controls according to an embodiment of the present invention.

FIG. 14A is a schematic diagram of an apparatus 140 for displaying graphical controls according to an embodiment of the present invention. The apparatus includes a display screen. The apparatus further includes a control unit 1401, a control function unit 1402, and a display unit 1403.

The control unit 1401 invokes an application program, and instructs the display unit to display a user interface of the application program on the display screen.

The control function unit 1402 invokes multiple control functions in the application program, and instructs the display unit to display graphical controls corresponding to the multiple control functions in the user interface of the application program, where the graphical controls include at least a contact graphical control, a media information graphical control, a text graphical control, and a switching function graphical control.

The contact graphical control is configured to display contact information. The media information graphical control is configured to play corresponding media information. The text graphical control is configured to display text information corresponding to the media information. The switching function graphical control is configured to switch between displaying the media information graphical control and displaying the media information graphical control and the text graphical control in the user interface of the application program.

The contact information is information about a contact that sends the media information.

The display unit 1403 displays the user interface of the application program on the display screen, and displays the graphical controls corresponding to the multiple control functions in the user interface of the application program, where the graphical controls include at least the contact graphical control, the media information graphical control, the text graphical control, and the switching function graphical control.

Figure 14B:
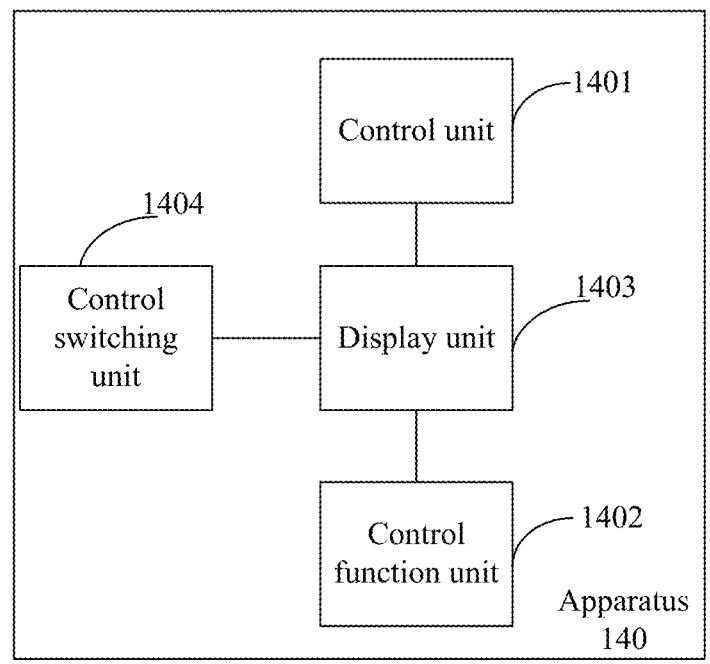
FIG. 14B is a schematic diagram of an apparatus 140 for displaying graphical controls according to another embodiment of the present invention.

FIG. 14B is a schematic diagram of an apparatus 140 for displaying graphical controls according to another embodiment of the present invention. As shown in FIG. 14B, the apparatus 140 further includes a control switching unit 1404.

The control switching unit 1404 is configured to instruct the display unit 1403 to switch between displaying the media information graphical control in the user interface of the application program and displaying the media information graphical control and the text graphical control in the user interface of the application program.

The display unit 1403 is further configured to display, according to the instruction of the control switching unit 1404, the media information graphical control in the user interface of the application program, or the media information graphical control and the text graphical control in the user interface of the application program.

The display unit 1403 is further configured to display a switching function graphical control corresponding to the control switching unit in the user interface of the application program, where the switching function graphical control is configured to receive a switching instruction, and instruct, according to the switching instruction, the display unit to display the media information graphical control in the user interface of the application program or display the media information graphical control and the text graphical control in the user interface of the application program.

Figure 15:
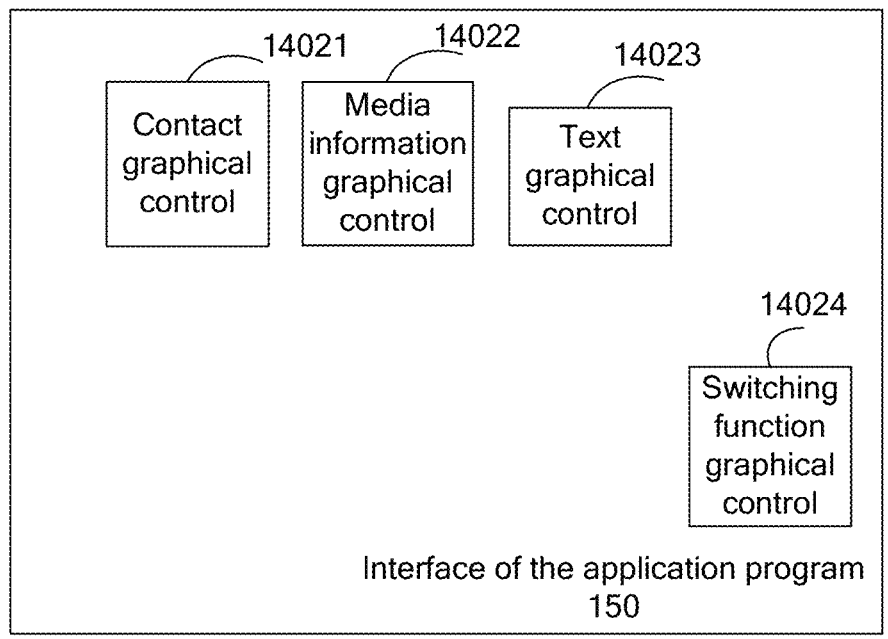
FIG. 15 is a schematic diagram of a user interface for displaying media information according to an embodiment of the present invention.

FIG. 15 is a schematic diagram of a user interface for displaying media information according to an embodiment of the present invention. As shown in FIG. 15, a user interface 150 of an application program is displayed on a display screen. A contact graphical control 14021, a media information graphical control 14022, a text graphical control 14023, and a switching function graphical control 14024 are displayed in the user interface 150 of the application program. The contact graphical control 14021 is configured to display contact information. The media information graphical control 14022 is configured to play corresponding media information. The text graphical control 14023 is configured to display text information corresponding to the media information. The switching function graphical control 14024 is configured to switch between displaying the media information graphical control and displaying the media information graphical control and the text graphical control in the user interface of the application program. In the user interface of the application program in this embodiment of the present invention, multiple contact graphical controls, media information graphical controls, text graphical controls, and switching function graphical controls may be displayed. The user interface of the application program in this embodiment of the present invention may be applied to media information communications software such as WeChat and MiTalk. For example, for a display effect of the user interface applied to WeChat, refer to the display user interfaces in FIG. 6A and FIG. 6B.

In the embodiment of the apparatus for displaying graphical controls according to the present invention, in a computer system, an application program is invoked; contact information, text content, and/or a keyword are/is displayed on a display screen; and communication records can be visually displayed to a user. It is avoided that the user has to click media links of all media information repeatedly to browse the communication records. In the method for displaying graphical controls according to this embodiment of the present invention, a destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 16:
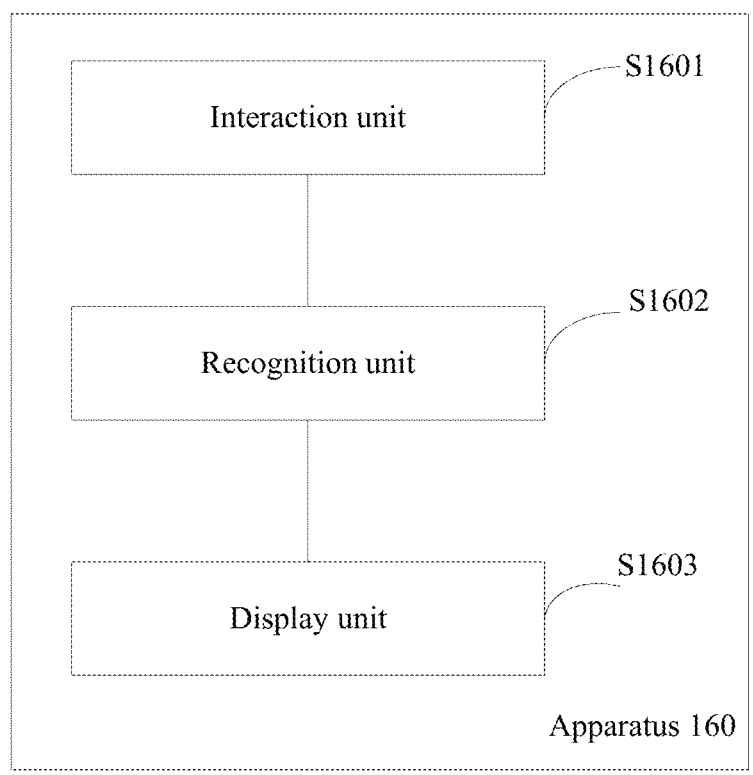
FIG. 16 is a schematic diagram of an apparatus 160 for displaying media information according to another embodiment of the present invention.

FIG. 16 is a schematic diagram of an apparatus 160 for displaying media information according to another embodiment of the present invention. As shown in FIG. 16, the apparatus 160 includes an interaction unit 1601, a recognition unit 1602, and a display unit 1603.

The interaction unit 1601 is configured to receive a media information request, where the media information request carries media information.

The recognition unit 1602 is configured to parse the received media information to obtain text information corresponding to the media information.

The display unit 1603 is configured to display the media information and the text information.

In this embodiment of the present invention, the recognition unit 1602 parses the received media information to obtain the text information corresponding to the media information. That the recognition unit 1602 parses the media information is specifically that the recognition unit 1602 performs media recognition according to the media information to obtain text content corresponding to the media information. The recognition unit 1602 may further determine, according to the recognized text content corresponding to the media information, a keyword corresponding to the text content.

The recognition unit 1602 parses, according to the media information received by the interaction unit 1601, the received media information to obtain the text information corresponding to the media information, and finally, the display unit 1603 displays the media information and the text information.

The interaction unit 1601 is further configured to receive a switching instruction, and instruct, according to the switching instruction, the display unit 1603 to display the media information, or the media information and the text information.

By using the apparatus for displaying media information, the destination client and an originating client display the media information and the text information, and implement a media information display process. For brevity, details are not described again.

In the embodiment of the apparatus for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 17:
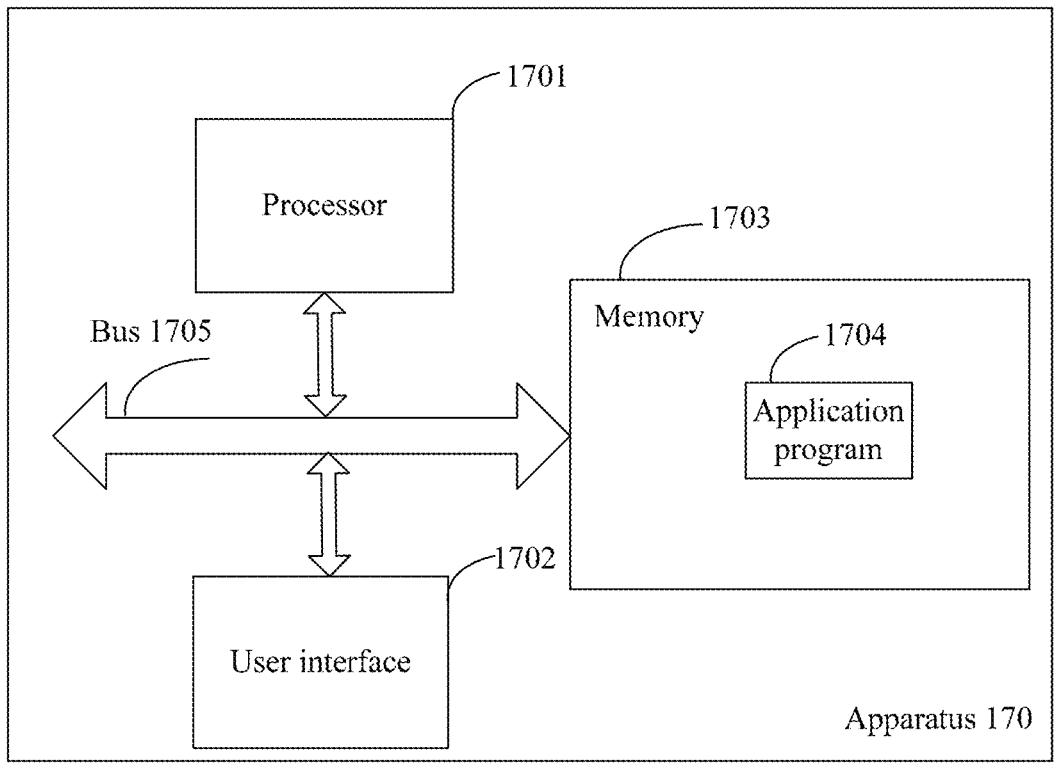
FIG. 17 is a schematic block diagram of an apparatus 170 for displaying media information according to another embodiment of the present invention.

FIG. 17 is a schematic block diagram of an apparatus 170 for displaying media information according to another embodiment of the present invention. As shown in FIG. 17, the apparatus 170 includes a processor 1701, a user interface 1702, a memory 1703, an application program 1704, and a bus 1705.

The processor 1701 is configured to execute a program of the embodiment of the present invention that is stored by the memory 1703, and perform bidirectional communication with other apparatuses by using the bus.

The memory 1703 may include one or more of a floppy disk, a USB flash drive, a removable hard disk, a read-only memory (ROM), a random access memory (RAM), a magnetic disk, or an optical disc of a computer, and is configured to store a program that can execute the embodiment of the present invention or an application database of the embodiment of the present invention, and receive an input of another component through the bus 1705 or invoke stored information by another component, for example, an instruction for querying a text information identifier, or querying a media information identifier, a text content identifier, and a keyword identifier.

The application program 1704 includes various system programs, and is configured to implement various application services.

The user interface 1702 is opened to a user, and is configured to connect to a terminal and perform data exchange.

The processor 1701 and the memory 1703 may also be integrated into a physical module that applies the embodiment of the present invention. The program that implements the embodiment of the present invention is stored and runs on the physical module.

Components of the server 170 are coupled together by using the bus 1705. In addition to a data bus, the bus 1705 may include a power bus, a control bus, a status signal bus, and the like. However, for clear description, various buses are marked as the bus 1705 in the figure.

In this embodiment of the present invention, units of the apparatus 170 respectively execute the following content.

The processor 1701 parses media information carried in the received media information request to obtain text information corresponding to the media information. Specifically, the processor 1701 performs media recognition according to the media information to obtain text content corresponding to the media information, and the processor 1701 determines, according to the recognized text content corresponding to the media information, a keyword corresponding to the text content.

The memory 1703 stores the media information request received by the user interface 1702.

The user interface 1702 is further configured to receive a media information request sent by an originating client, where the media information request carries media information and destination client information, and send composite information to a destination client according to the destination client information carried in the media information request.

Optionally, the user interface 1702 is further configured to receive a request sent by the client for querying a text information identifier.

Optionally, the user interface 1702 is further configured to send the text information to the originating client and the destination client.

Optionally, the user interface 1702 is further configured to receive a request sent by the client for querying a media information identifier, a text content identifier, and a keyword identifier.

Optionally, the user interface 1702 is further configured to send the media information, the text content, and the keyword to the originating client and the destination client.

Optionally, the user interface 1702 sends the request for querying the text information identifier, a media information identifier request, a text content identifier request, and a keyword identifier request, or the composite information sent by the processor 1701.

The memory 1703 stores the text information corresponding to the media information and obtained by the processor 1701 by parsing the media information.

Optionally, the memory 1703 may further store the composite information obtained by the processor 1701 by synthesizing the media information or the media information identifier with the text information or the text information identifier.

Optionally, the memory 1703 may further store a data association table of an association relationship between the text information identifier and the text information.

Optionally, the memory 1703 may further store a data association table of association relationship between the media information identifier and the media information, association relationship between the text content identifier and the corresponding text content, and association relationship between the keyword identifier and the corresponding keyword.

Optionally, the memory 1703 may further store the text information found by the processor 1701.

Optionally, the memory 1703 may further store the media information, the text content, and the keyword that are found by the processor 1701.

The processor 1701 synthesizes the media information or the media information identifier with the text information or the text information identifier to obtain the composite information.

Optionally, the processor 1701 synthesizes the media information with the text information into composite format information.

Optionally, the processor 1701 may further create the data association table, and establish the association relationship between the text information identifier and the text information.

Optionally, the processor 1701 may further search the data association table stored in the memory 1703 to find the text information corresponding to the text information identifier.

Optionally, the processor 1701 may further create the data association table, and establish the association relationships between the media information identifier and the media information, the text content identifier and the text content, and the keyword identifier and the keyword.

Optionally, the processor 1701 may further search the data association table stored in the memory 1703 to find the media information corresponding to the media information identifier, the text content corresponding to the text content identifier, and the keyword corresponding to the keyword identifier.

By using the apparatus for displaying media information, the destination client and the originating client display the media information and the text information, and implement a media information display process. For brevity, details are not described again.

In the embodiment of the apparatus for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

Figure 18:
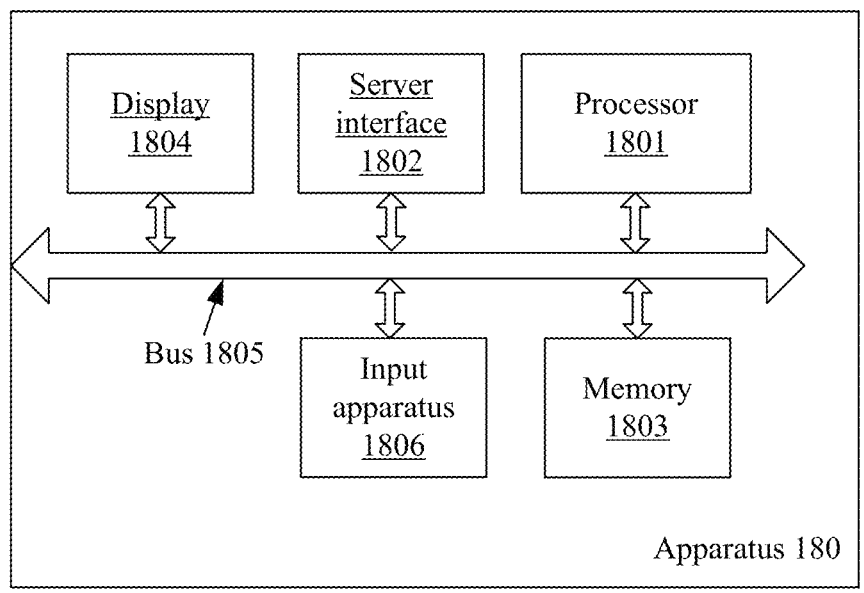
FIG. 18 is a schematic block diagram of an apparatus 180 for displaying media information according to another embodiment of the present invention.

FIG. 18 is a schematic block diagram of an apparatus 180 for displaying media information according to another embodiment of the present invention. As shown in FIG. 18, the apparatus 180 includes a processor 1801, a server user interface 1802, a memory 1803, a display 1804, an input apparatus 1806, and a bus 1805.

The processor 1801 is configured to execute a program of the embodiment of the present invention that is stored by the memory 1803, and perform bidirectional communication with other apparatuses by using the bus.

The server user interface 1802 is configured to connect to a server, and perform data exchange.

The memory 1803 may include one or more of a floppy disk, a USB flash drive, a removable hard disk, a read-only memory (ROM), a random access memory (RAM,), a magnetic disk, or an optical disc of a computer, and is configured to store a program that can execute the embodiment of the present invention or an application database of the embodiment of the present invention, and receive an input of another component through the bus 1805 or invoke stored information by another component, for example, an instruction for querying a text information identifier, or querying a media information identifier, a text content identifier, and a keyword identifier.

The display 1804 may be an appropriate apparatus such as a cathode ray tube (CRT) display, a liquid crystal display (LCD), or a touchscreen, and receives an instruction through the bus 1805 so that a graphical user interface is displayed on a screen of the display.

The input apparatus 1806 may include any appropriate apparatus such as a keyboard, a mouse, a track recognizer, or a speech recognition user interface, and is configured to receive an input of a user, and generate a control input that is sent to the processor or another component through the bus 1805. Particularly, when the display of the apparatus 180 has a touchscreen, the display is also an input apparatus.

The processor 1801 and the memory 1803 may also be integrated into a physical module that applies the embodiment of the present invention. The program that implements the embodiment of the present invention is stored and runs on the physical module.

Components of the apparatus 180 are coupled together by using the bus 1805. In addition to a data bus, the bus 1805 may include a power bus, a control bus, a status signal bus, and the like. However, for clear description, various buses are marked as the bus 1805 in the figure.

In this embodiment of the present invention, units of the apparatus 180 respectively execute the following content.

The display 1804 receives an instruction of the processor 1801, so that a graphical user interface is displayed on the screen of the display.

When composite information is composite format information, the processor 1801 is configured to parse the composite format information to obtain the media information and the text information, and the display 1802 displays the media information and the text information.

Optionally, when the composite information is a combination of the media information and a text information identifier, the processor 1801 is further configured to parse the obtained text information identifier, and instruct the server user interface 1802 to send a query request to the server, requesting the server to query a data association table to obtain the text information corresponding to the text information identifier. The display 1802 displays the media information and the text information that are received from the server user interface.

Optionally, when the composite information is a combination of a media information identifier, a text content identifier, and a keyword identifier, the processor 1801 is further configured to parse the obtained media information identifier, text content identifier, and keyword identifier, and instruct the server user interface 1802 to send a query request to the server, requesting the server to query a data association table to obtain the media information corresponding to the media information identifier, the text content corresponding to the text content identifier, and the keyword corresponding to the keyword identifier. The display 1804 displays the media information, the text content, and the keyword that are received from the server user interface.

By using the client for displaying media information, the destination client and an originating client display the media information and the text information, and implement a media information display process. For brevity, details are not described again.

In the embodiment of the client for displaying media information according to the present invention, a server receives media information, parses the media information to obtain corresponding text information, synthesizes the media information with the text information to obtain composite information, and sends the composite information to a destination client. Finally, the destination client displays the media information and the text information in a display user interface simultaneously, and communication records can be visually displayed to a user. It is avoided that the user has to click media links of all media information repeatedly to browse the communication records. In the method for displaying media information according to this embodiment of the present invention, the destination client displays the media information and the text information simultaneously, and by browsing the text information, the user can browse media information content quickly and visually. In this way, storage space and processes occupied on a terminal may be reduced, consumption of CPU resources is reduced, and efficiency of obtaining the media information content is improved. Better user experience is provided for the user, and practical applicability is high.

The embodiments of the method, apparatus, and client for displaying media information, and the method and apparatus for displaying graphical controls according to the present invention may be applied to media information instant messaging software such as WeChat and MiTalk. The instant messaging software may be installed on a terminal or a mobile terminal such as a mobile phone, a personal PC computer, or a PAD.

A person of ordinary skill in the art may be aware that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing server and unit, refer to a corresponding process in the foregoing method embodiments, and details are not described herein again.

In the several embodiments provided in the present application, the disclosed server and method may be implemented in other manners. For example, the described server embodiment is merely an example. For example, the unit division is merely logical function division and may be other division in actual implementation. For example, a plurality of units or components may be synthesized or integrated into another system, or some features may be ignored or not performed. In addition, the displayed or discussed mutual couplings or direct couplings or communication connections may be implemented by using some user interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for displaying voice messages comprising:
   displaying, by a first electronic device, a first user interface of an application for chatting on a touch screen;
   sending, by the first electronic device, a voice message to a second electronic device;
   displaying, by the first electronic device, a first visual representation of the voice message on the first user interface together with a switching function control, wherein a selection of the first visual representation results in the voice message being played at the first electronic device;
   detecting, by the first electronic device, a first user operation on the switching function control;
   displaying, by the first electronic device and in response to the first user operation, a feature information together with the first visual representation of the voice message, wherein the feature information indicates a mood, and wherein the feature information is displayed overlapped with an end of the first visual representation of the voice message;
   detecting a second user operation on the switching function control;
   in response to the second user operation, ceasing to display the feature information on the first user interface;
   sending, by the first electronic device, the voice message to a second electronic device by way of a server;
   displaying, by the second electronic device, a second user interface of the application for chatting on a display screen of the second electronic device;
   receiving, from the server, the voice message and the feature information by the second electronic device; and
   displaying, by the second electronic device, a second visual representation of the voice message on the second user interface, the feature information corresponding to the voice message being displayed together with the second visual representation of the voice message, wherein a selection of the second visual representation results in the voice message being played at the second electronic device.

2. The method according to claim 1, wherein the first user interface comprises a contact graphical control being configured to display contact information.

3. The method according to claim 2, wherein the first user interface comprises a text graphical control being configured to display text information corresponding to the voice message.

4. The method according to claim 1, wherein the feature information comprises an emoticon.

5. The method according to claim 1, further comprising:
   detecting a third user operation on the switching function control;
   in response to the third user operation, displaying text information corresponding to the voice message, the text information being displayed together with the first visual representation of the voice message.

6. The method according to claim 5, wherein the text information comprises a keyword corresponding to the voice message.

7. A system comprising:
   a server, a first electronic device, and a second electronic, wherein the first electronic device is configured to:

display a first user interface of an application for chatting on a touch screen;
send a voice message to the second electronic device;
display a first visual representation of the voice message on the first user interface together with a switching function control, wherein a selection of the first visual representation results in the voice message being played at the first electronic device;
detect a first user operation on the switching function control;
display, in response to the first user operation, a feature information together with the first visual representation of the voice message, wherein the feature information indicates a mood, and wherein the feature information is displayed overlapped with an end of the first visual representation of the voice message;
detect a second user operation on the switching function control; and
in response to the second user operation, cease to display the feature information on the first user interface;
wherein the server is configured to:
receive the voice message from the first electronic device;
sending the voice message to the second electronic device; and
the second electronic device is configured to:
display a second user interface of the application for chatting;
receive the voice message and the feature information from the server;
display a second visual representation of the voice message on the second user interface, the feature information corresponding to the voice message being displayed together with the second visual representation of the voice message, wherein a selection of the second visual representation results in the voice message being played at the second electronic device.

8. The system according to claim 7, wherein the first user interface comprises a contact graphical control being configured to display contact information.

9. The system according to claim 8, wherein the first user interface comprises a text graphical control being configured to display text information corresponding to the voice message.

10. The system according to claim 7, wherein the feature information comprises an emoticon.

11. An electronic device comprising:
a touch screen;
at least one processor; and
a memory coupled to the at least one processor and storing programming instructions that, when executed by the at least one processor, cause the electronic device to:
display a first user interface of an application for chatting on the touch screen;
send a voice message to a second electronic device;
display a first visual representation of the voice message on the first user interface together with a switching function control, wherein a selection of the first visual representation results in the voice message being played at the electronic device;
detect a first user operation on the switching function control;
display, in response to the first user operation, a feature information together with the first visual representation of the voice message, wherein the feature information indicates a mood, and wherein the feature information is displayed as being at least partly overlapped with an end of the first visual representation of the voice message;
detect a second user operation on the switching function control; and
in response to the second user operation, ceasing to display the first visual representation of the voice message on the first user interface.

12. The electronic device according to claim 11, wherein the electronic device is further caused to:
detect a third user operation on the switching function control;
in response to the third user operation, display text information corresponding to the voice message, the text information being displayed together with the first visual representation of the voice message.

13. The electronic device according to claim 12, wherein the text information comprises a keyword corresponding to the voice message.

14. The electronic device according to claim 11, wherein the feature information comprises an emoticon.

15. A non-transitory computer readable storage medium comprising instructions to cause an electronic device to carry out the following operations:
display a first user interface of an application for chatting on a touch screen;
send a voice message to a second electronic device;
display a first visual representation of the voice message on the first user interface, a switching function control being displayed together with the first visual representation of the voice message, wherein a selection of the first visual representation results in the voice message being played at the electronic device;
detect a first user operation on the switching function control;
in response to the first user operation, display a feature information, the feature information being displayed together with the first visual representation of the voice message and indicating a mood, wherein the feature information is displayed overlapped with an end of the first visual representation of the voice message;
detect a second user operation on the switching function control; and
in response to the second user operation, cease to display the feature information on the first user interface.

* * * * *